(12) United States Patent
Hirai et al.

(10) Patent No.: US 8,280,742 B2
(45) Date of Patent: Oct. 2, 2012

(54) INPUT DEVICE AND INPUT METHOD FOR MOBILE BODY

(75) Inventors: Takuya Hirai, Osaka (JP); Atsushi Yamashita, Osaka (JP); Tomohiro Terada, Osaka (JP)

(73) Assignee: Panasonic Corporation, Osaka (JP)

( * ) Notice: Subject to any disclaimer, the term of this patent is extended or adjusted under 35 U.S.C. 154(b) by 1153 days.

(21) Appl. No.: 12/095,619

(22) PCT Filed: Dec. 11, 2006

(86) PCT No.: PCT/JP2006/324692
§ 371 (c)(1),
(2), (4) Date: May 30, 2008

(87) PCT Pub. No.: WO2007/069573
PCT Pub. Date: Jun. 21, 2007

(65) Prior Publication Data
US 2010/0153111 A1    Jun. 17, 2010

(30) Foreign Application Priority Data

Dec. 16, 2005   (JP) .................................. 2005-363013

(51) Int. Cl.
| | |
|---|---|
| G10L 21/00 | (2006.01) |
| G10L 15/22 | (2006.01) |
| G06K 9/00 | (2006.01) |
| G09G 5/00 | (2006.01) |
| G06F 3/041 | (2006.01) |
| G06F 7/00 | (2006.01) |
| G06F 17/00 | (2006.01) |
| G05D 1/00 | (2006.01) |
| G05D 3/00 | (2006.01) |
| G01C 22/00 | (2006.01) |

(52) U.S. Cl. ........ 704/275; 704/270; 704/274; 382/104; 345/156; 345/173; 701/1; 701/28; 701/36; 701/423; 701/427

(58) Field of Classification Search ................ 704/270.1
See application file for complete search history.

(56) References Cited

U.S. PATENT DOCUMENTS
5,266,922 A * 11/1993 Smith et al. ................... 340/525
(Continued)

FOREIGN PATENT DOCUMENTS
EP         1 408 303        4/2004
(Continued)

OTHER PUBLICATIONS

International Search Report mailed Mar. 6, 2007 for International Application No. PCT/JP2006/324692.

(Continued)

*Primary Examiner* — Talivaldis Ivars Smits
*Assistant Examiner* — Matthew Baker
(74) *Attorney, Agent, or Firm* — Wenderoth, Lind & Ponack, L.L.P.

(57) ABSTRACT

An input device for a mobile body allows for a safe input operation at the time of operating equipment, such as a car, regardless of whether the mobile body is traveling or stopped. The input device includes an input section for receiving inputs by hand and voice operations, a traveling state determination section for determining a traveling state of the mobile body, and an item executability determination section for determining, in the determined traveling state, whether each of the received inputs corresponds to an item executable by the hand and voice operations. The input device also includes a display content generation section for generating a display mode which distinguishably shows whether nor not the item is executable by the hand and voice operations in accordance with a determination by the item executability determination section, and a display section for displaying the generated display mode.

13 Claims, 22 Drawing Sheets

U.S. PATENT DOCUMENTS

| | | | |
|---|---|---|---|
| 5,757,359 A * | 5/1998 | Morimoto et al. | 345/156 |
| 5,884,249 A * | 3/1999 | Namba et al. | 704/9 |
| 6,353,778 B1 * | 3/2002 | Brown | 701/1 |
| 6,415,224 B1 * | 7/2002 | Wako et al. | 701/409 |
| 6,438,465 B2 * | 8/2002 | Obradovich et al. | 701/1 |
| 6,449,535 B1 * | 9/2002 | Obradovich et al. | 701/1 |
| 6,535,615 B1 * | 3/2003 | Zachmann et al. | 382/100 |
| 6,653,948 B1 * | 11/2003 | Kunimatsu et al. | 340/995.19 |
| 6,717,287 B2 * | 4/2004 | Tengler et al. | 307/10.1 |
| 6,897,861 B2 * | 5/2005 | Watanabe et al. | 345/419 |
| 7,062,362 B2 * | 6/2006 | Obradovich et al. | 701/1 |
| 7,177,762 B2 * | 2/2007 | Bruelle-Drews | 701/211 |
| 7,461,352 B2 * | 12/2008 | Katsuranis | 715/800 |
| 7,519,469 B2 * | 4/2009 | de Silva et al. | 701/454 |
| 7,826,945 B2 * | 11/2010 | Zhang et al. | 701/36 |
| 2001/0029410 A1 * | 10/2001 | Obradovich | 701/1 |
| 2002/0107696 A1 * | 8/2002 | Thomas et al. | 704/275 |
| 2002/0141600 A1 * | 10/2002 | Siwinski | 381/86 |
| 2003/0033083 A1 * | 2/2003 | Nakashima et al. | 701/211 |
| 2003/0117365 A1 * | 6/2003 | Shteyn | 345/156 |
| 2004/0080434 A1 * | 4/2004 | Watanabe et al. | 340/995.1 |
| 2004/0088105 A1 * | 5/2004 | Craine | 701/200 |
| 2004/0176906 A1 | 9/2004 | Matsubara et al. | |
| 2004/0204851 A1 * | 10/2004 | Fukuyasu | 701/213 |
| 2006/0041345 A1 * | 2/2006 | Metcalf | 701/33 |
| 2006/0047386 A1 * | 3/2006 | Kanevsky et al. | 701/36 |
| 2007/0005206 A1 * | 1/2007 | Zhang et al. | 701/36 |
| 2007/0008189 A1 * | 1/2007 | Amari et al. | 340/995.19 |
| 2007/0213092 A1 * | 9/2007 | Geelen | 455/556.1 |
| 2009/0172527 A1 * | 7/2009 | Buecker et al. | 715/700 |

FOREIGN PATENT DOCUMENTS

| | | | |
|---|---|---|---|
| JP | 07-230465 | | 8/1995 |
| JP | 07-319383 | * | 8/1995 |
| JP | 09-016891 | | 1/1997 |
| JP | 10-089982 | | 4/1998 |
| JP | 2000-352993 | | 12/2000 |
| JP | 2001-216129 | | 8/2001 |
| JP | 2005-49110 | | 2/2005 |
| JP | 2005-121563 | | 5/2005 |
| JP | 2005-208798 | * | 8/2005 |
| JP | 2005208798 | * | 8/2005 |
| JP | 2005-335554 | | 12/2005 |

OTHER PUBLICATIONS

Supplementary European Search Report dated Nov. 3, 2010 in corresponding European Application No. 06834447.2.

* cited by examiner

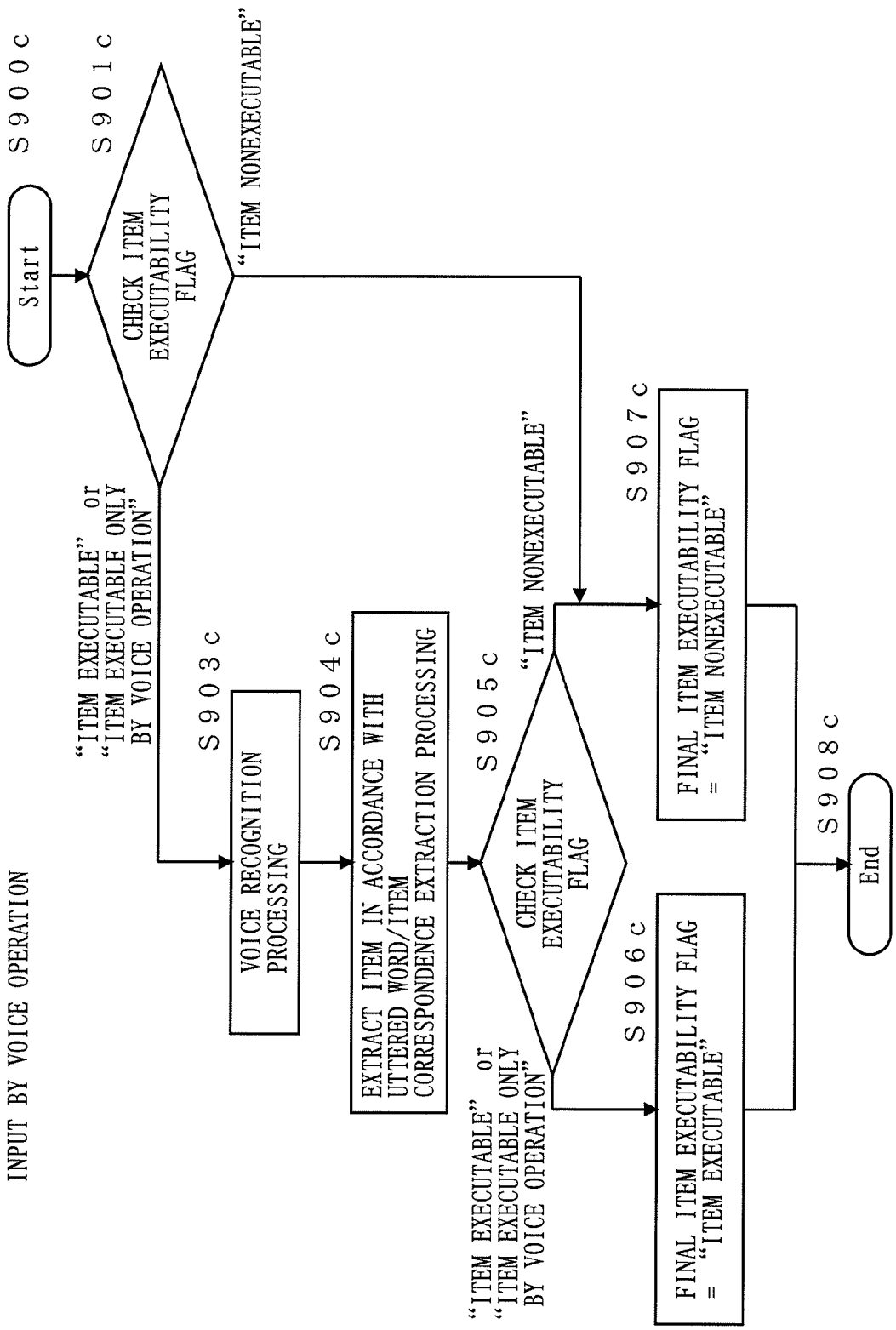

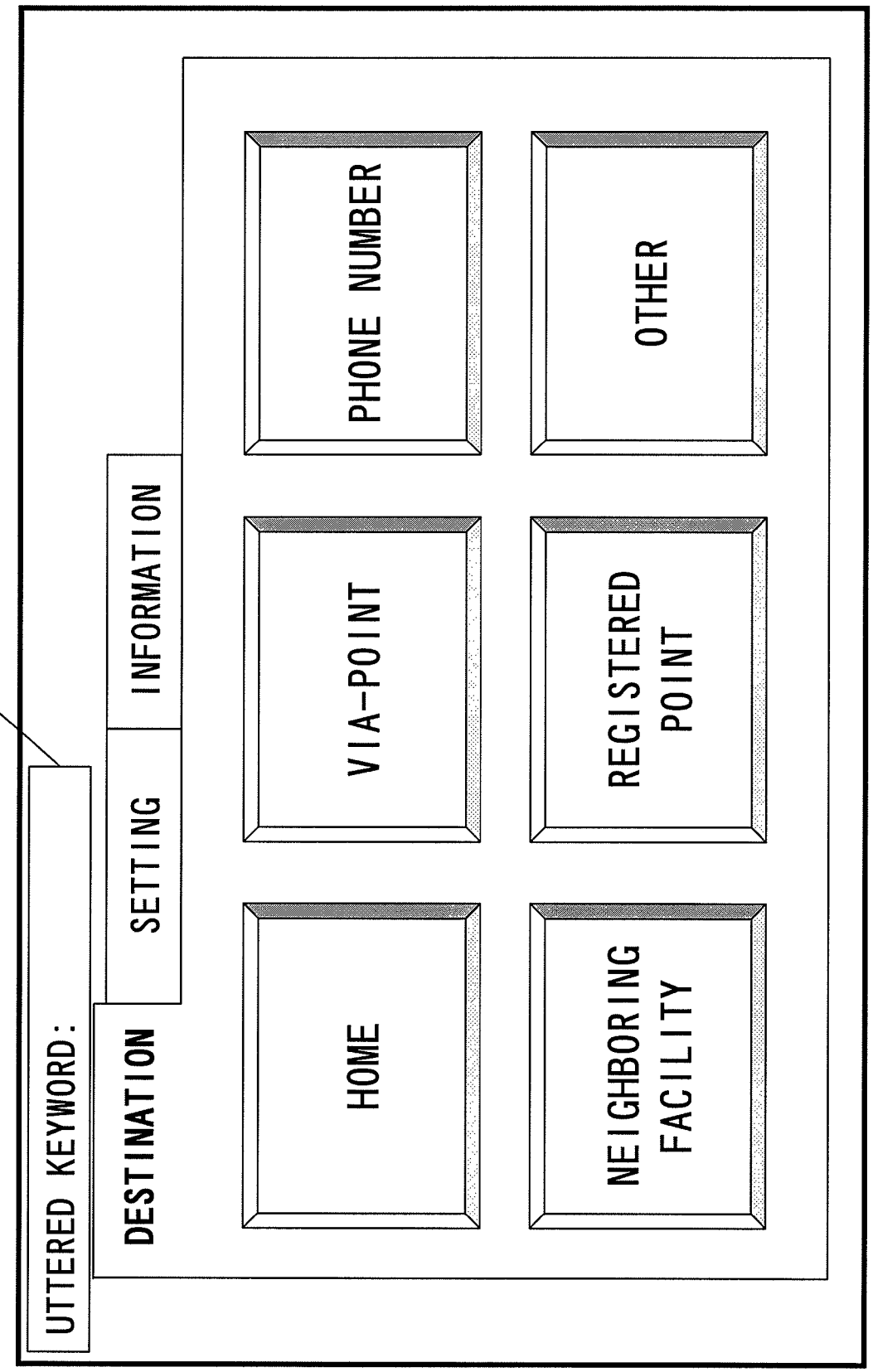

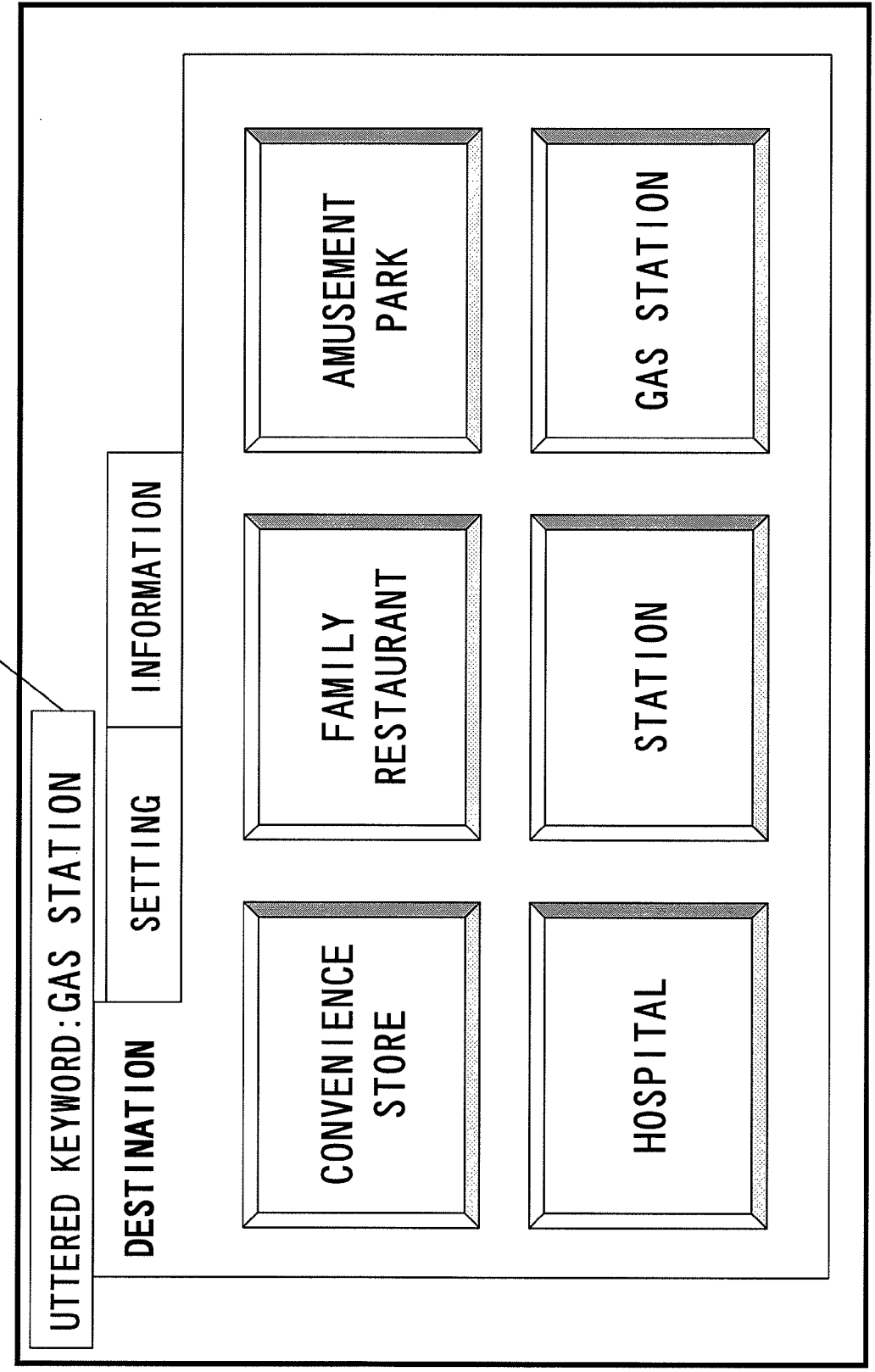

INPUT DEVICE AND INPUT METHOD FOR MOBILE BODY

TECHNICAL FIELD

The present invention relates to an input operation to a device fixed to a mobile body, and more particularly relates to an input device for a mobile body, and an input method thereof, which execute a predetermined operation in accordance with a user's selection from various menu items.

BACKGROUND ART

There may be a case where, in a device fixed to a mobile body, items to be operated are restricted depending on whether the mobile body is traveling or stopping, particularly for the sake of safety driving. For example, a car navigation system mounted on a vehicle has not only a navigation function for guiding the vehicle to a destination but also a multi-function such as reproduction of a music file by using various mediums including a CD, a DVD, an HDD and the like. Therefore various functions are aggregated into one device.

Generally, menus for these functions are displayed in a hierarchical format, and due to the multi-function, the hierarchies of the menus are increasingly deep and complicated. As an example, in the case of a display shown FIG. 18, a user presses respective buttons of an input section such as a remote control and a touch panel, and navigates through the menu hierarchies thereby operating the device. Due to a safety problem such as a problem in which performing such operation during driving leads to distracted steering, the device is configured such that only some of the functions are selectable.

As shown in FIG. 19, most of the functions are each set to notify the user that the function is not selectable when a button thereof is displayed in a toned-down manner, and to be restricted so as not to be executed even if an input thereof is performed. For example, when the user navigates through the menu hierarchies while the vehicle stops at the red light and then the vehicle starts moving after the light turns green, input operation cannot be continuously performed until the vehicle stops next. Further, as a feature of the car navigation device, there may be a case where when the device determines that the vehicle is traveling, the device ends a menu operation screen so as to change the screen to a map screen, and when the vehicle starts moving again, the user may be requested to perform the menu operation from the beginning.

In the case of the conventional input device for the mobile body, when a traveling determination section determines that the vehicle is traveling while the menu hierarchies are navigated through, a history of the previous menu operation may be saved by performing a predetermined operation, and an input to the menu operation may be continued when it is determined that the vehicle travels at a predetermined speed (e.g., see Patent document 1). As another example, there is a device which includes a voice input section which enables an operation of the device even during driving. That is, the user utters a dedicated command which is registered to a dictionary for voice recognition, whereby a function of the device is executed. With this method, the user can safely operate the device without taking their hands off a steering wheel. However, there are hundreds of dedicated commands for the voice recognition, and it is impossible for the user to memorize all the commands. In addition, it is unrealistic for the user to open a user's manual each time so as to find the dedicated command. By displaying a help screen for the voice recognition, the user may be able to recognize some of the dedicated commands. However, the user is not necessarily able to execute a desired function. Further, there is a device in which when the user navigates through the menu hierarchies by using the remote control and the touch panel and finally executes a command, a name of the dedicated command for the voice recognition is informed vocally so as to encourage the use of a voice input (e.g., see Patent document 2).

Patent document 1: Japanese Laid-Open Patent Publication No. 2005-49110

Patent document 1: Japanese Laid-Open Patent Publication No. 2001-216129

SUMMARY OF THE INVENTION

Problems to be Solved by the Invention

In above-described Patent document 1, a menu in an upper hierarchy, the menu having been operated during stopping, is shown at the time of the next stopping, whereby the operation to navigate through the menu hierarchies is continuously performed. However, a vehicle is considered to be traveling until the speed thereof reduces to the predetermined speed, and accordingly, the operation cannot be inputted subsequently to the operation performed at the previous stopping. That is, basically, the input operation cannot be performed during traveling, and a fundamental solution has not been achieved. In above-described Patent document 2, the menu hierarchies are navigated through by using the remote control, the touch panel and the like, and the name of the dedicated command for the voice recognition is informed vocally to the user when the command is executed, whereby the use of the input device is encouraged. If commands are frequently used by the user, and if the number of the commands is small, the user can memorize such commands. However, it is difficult for the user to memorize all the commands which the user wishes to execute, and it is also troublesome for the user to search a dedicated command for the voice recognition which the user wishes to know.

The present invention is developed in consideration of the above-described problems. That is, an object of the present invention is to provide an input device for a mobile body, the input device which enables the user to navigate through the menu hierarchies safely, and which can be operated in a simple manner regardless of whether the vehicle is traveling or stopped.

Solution to the Problems

A first aspect of the present invention is directed to an input device for a mobile body. The present invention comprises: an input section for receiving inputs by a hand operation and by a voice operation; a traveling state determination section for determining a traveling state of the mobile body; an item executability determination section for determining, in the traveling state determined by the traveling state determination section, executability by the hand operation and executability by the voice operation of respective items which indicate functions operated by the inputs received by the input section; a display content generation section for generating, in accordance with a determination made by the item executability determination section, a display mode for each of the items such that the executability by the hand operation and the executability by the voice operation thereof are distinguishably shown; and a display section for displaying each of the items in the display mode generated by the display content generation section.

Further, the input device comprises an item execution determination section for determining whether or not to execute the input received by the input section. Preferably, the display content generation section generates a result of an operation caused by the input received by the input section in accordance with a content determined by the item execution determination section, and the display section displays the result of the operation generated by the display content generation section.

Preferably, in the case where a function of the item is non-executable, the item executability determination section determines that the item is non-executable either by the hand operation or by the voice operation.

Preferably, the display content generation section generates a display mode which distinguishably shows a case where the item is executable by the voice operation only and a case where the item is executable by the hand operation and the voice operation.

Preferably, the display content generation section generates a display content so as to indicate, by using a display mode in which characters of the item are highlighted, that the item is executable by the voice operation.

Preferably, the display content generation section generates a display content so as to indicate that the item is executable by the hand operation and by the voice operation by using symbol marks of the respective operations.

Preferably, the display content generation section generates a display mode which distinguishably shows a case where the item is executable only by the voice operation, a case where the item is executable by the hand operation and the voice operation, and a case where the item is non-executable by the hand operation and the voice operation.

Preferably, the display content generation section generates a display mode for displaying the item three-dimensionally in the case where the item is executable by the hand operation and the voice operation, a display mode for displaying the item two-dimensionally in the case where the item is executable only by the voice operation, and a display mode for displaying two-dimensionally in a toned-down manner in the case where the item is non-executable by the hand operation and the voice operation.

Preferably, the display content generation section generates a display mode for highlighting, when the item executable only by the voice operation is selected by the hand operation, a display content so as to indicate that the item is executable only by the voice operation.

Preferably, the display content generation section generates a display mode for highlighting a name of the item or for causing an uttered word or the name of the item to be displayed in a pop-up form so as to indicate that the item is executable only by the voice operation.

Preferably, in the case where the item is non-executable by the voice operation, the item execution determination section eliminates a word in a dictionary for the voice operation, the word corresponding to the item, from search targets in voice recognition processing.

Preferably, the display content generation section generates a display content so as to display a word used by the voice operation and/or a word of an item selected by the hand operation as a history.

A second aspect of the present invention is directed to an input method for a mobile body. The present invention comprises: an input step of receiving inputs by a hand operation and by a voice operation; a traveling state determination step of determining a traveling state of the mobile body; an item executability determination step of determining, in the traveling state determined by the traveling state determination step, executability by the hand operation and executability by the voice operation of respective items which indicate functions operated by the inputs received by the input section; a display content generation step of generating, in accordance with a determination made by the item executability determination step, a display mode for each of the items such that the executability by the hand operation and the executability by the voice operation thereof are distinguishably shown; and a display step of displaying each of the items the display mode generated by the display content generation step.

Effect of the Invention

As above described, according to the respective aspects of the present invention, the input device for the mobile body can be provided which previously shows, to the user, whether an item is executable by a voice operation or by a hand operation, regardless of whether the mobile body is traveling or stopping, whereby the user can recognize an item executable and an operation method selectable at a current moment, and the user can also perform an input operation without setting the operation method to either the voice operation or the hand operation.

BRIEF DESCRIPTION OF THE DRAWINGS

FIG. 5c is an operation flow chart showing processing in which, when an item is not executable by a voice operation, vocabularies relating to the item is previously eliminated from a dictionary for voice recognition.

FIG. 9a is a diagram showing a screen display before a voice input.

FIG. 10 is a diagram showing an exemplary case where a word uttered in the voice operation is displayed.

Figure 1:
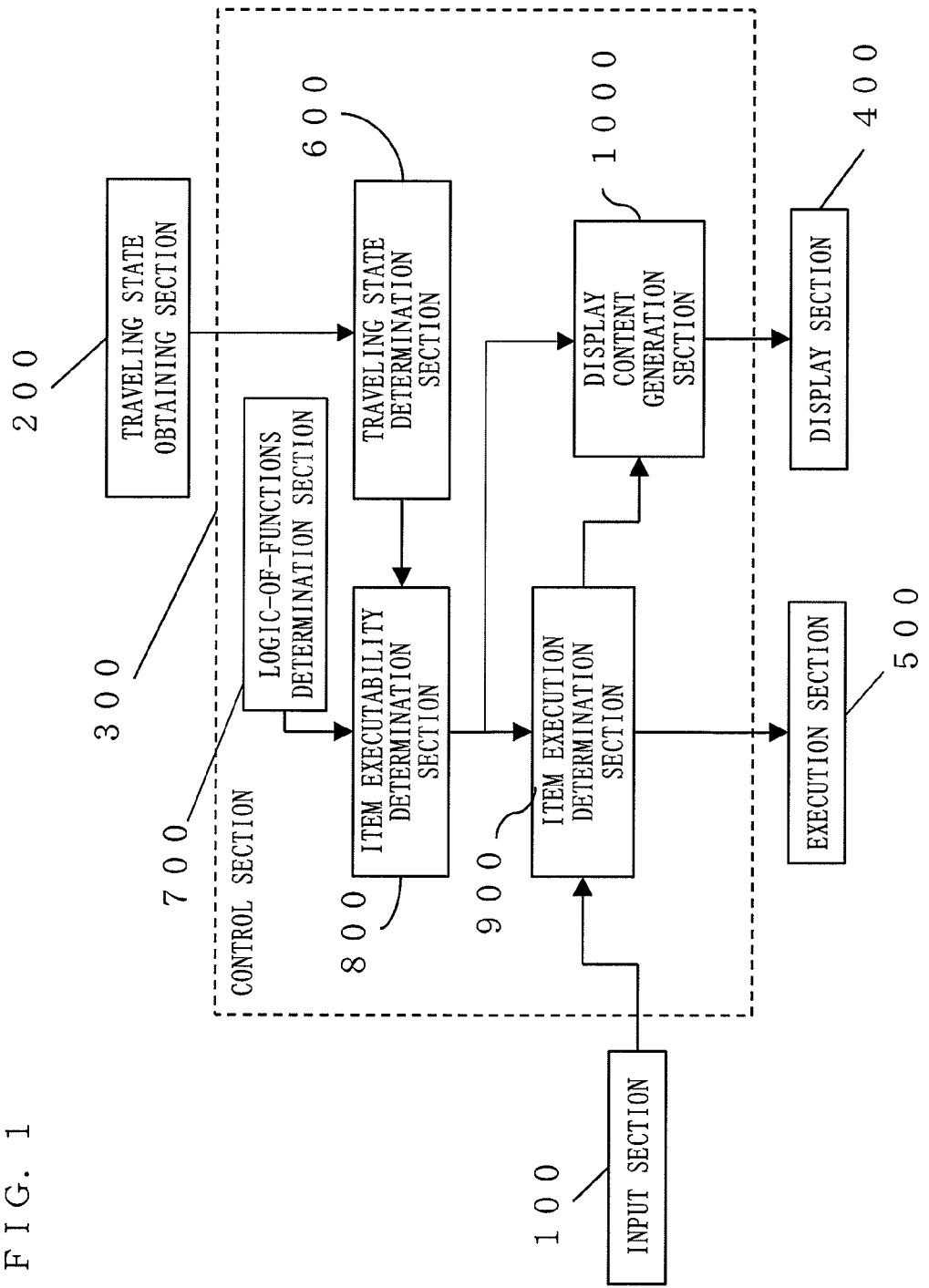
FIG. 1 is a block diagram showing a configuration of an embodiment of the present invention.

DESCRIPTION OF THE REFERENCE CHARACTERS 100 input section
200 traveling state obtaining section
300 control section
400 display section
500 execution section
600 traveling state determination section
700 logic-of-functions determination section
800 item executability determination section
900 item execution determination section
910 voice recognition section
911 uttered word determination section
912 dictionary storage section
920 uttered word/item correspondence extraction section
921 uttered word/item correspondence determination section
922 uttered word/item correspondence storage section
1000 display content generation section

DETAILED DESCRIPTION OF THE INVENTION

Hereinafter, with reference to diagrams, an input device for a mobile body according to an embodiment of the present invention will be described. In each of the diagrams, those parts which are not particularly important for the present inventions are omitted for the sake of easy viewability.

FIG. 1 is a block diagram showing a general configuration of the input device for the mobile body of the present invention. The input device is configured with an input section 100, a traveling state obtaining section 200, a control section 300, a display section 400 and an execution section 500.

The input section 100 is, for example, typified by a microphone receiving a voice input operation, which is an exemplary operation acceptable during traveling, and is a touch panel receiving a hand input operation, which is an exemplary operation unacceptable during traveling. As the hand input operation, an input to the touch panel, where a two-dimensional coordinate point is inputted, is mainly assumed in the present embodiment. However, input by using a remote control or the like may be also applicable.

The traveling state obtaining section 200 inputs, to the control section 300, a state in which the mobile body (considered as a vehicle in the present embodiment) having the device of the present invention mounted thereon is traveling. As a method therefor, vehicle speed pulse information may be inputted, or alternatively, a GPS signal may be inputted. Further, in order to indicate that the vehicle is not in a stop mode, a state of whether or not an emergency brake is applied or a state of whether or not the gear is in a parking position may be inputted.

The display section 400 is a device for displaying a state of a car navigation, an audio system, and the like, and is typified by a screen and a head-up display which display images projected through an LCD display, an organic EL, a CRT monitor, and a projector.

The control section 300 includes a traveling state determination section 600, a logic-of-functions determination section 700, an item executability determination section 800, an item execution determination section 900 and a display content generation section 1000. Each of these sections will be subsequently described in detail.

The traveling state determination section 600 receives a signal from the traveling state obtaining section 200, and determines whether or not the vehicle is in a travel mode. Under the condition where the signal from the traveling state obtaining section 200 is the vehicle speed pulse and a reference value is set as a criterion, when the vehicle speed pulse is equal to or greater than the reference value, a traveling state of the vehicle is determined to be in a travel mode, whereas when the vehicle speed pulse is less than the reference value, the traveling state of the vehicle is determined to be in a stop mode. A result of the determination is outputted to the item executability determination section 800.

The logic-of-functions determination section 700 performs processing for determining whether or not functions representing items included in the menu are executable. For example, in the case of a car navigation, if a route guide to a destination is not being performed, the logic-of-functions determination section 700 determines that a function of an item "stop guiding" is non-executable, and sets the logic-of-functions determination flag to "non-executable". The logic-of-functions determination flag is set with respect to each of the items, and is outputted to the item executability determination section 800.

The item executability determination section 800 receives an item having the traveling state of vehicle added thereto from the traveling state determination section 600, and also receives the items having the logic-of-functions determination flags added thereto from the logic-of-functions determination section 700. Accordingly, processing is performed for adding an item executability flag, which indicates that the item is executable or non-executable, to each of the items.

The item execution determination section 900 receives a signal from the input section 100 and also receives the item executability flag from the item executability determination section 800, and then finally determines whether or not the item is executable in accordance with the received information, and outputs the information to the execution section 500 and the display content generation section 1000.

The display content generation section 1000 generates a content to show the user whether each of the items included in the menu is executable or non-executable, and outputs the generated content to the display section 400. As methods to generate the content to be displayed, there are a case where the content to be displayed is generated based on the signal from the input section 100 and a case where the content to be displayed is generated based on the information from the item executability determination section 800 regardless of the signal from the input section 100. Details will be described later.

Figure 2:
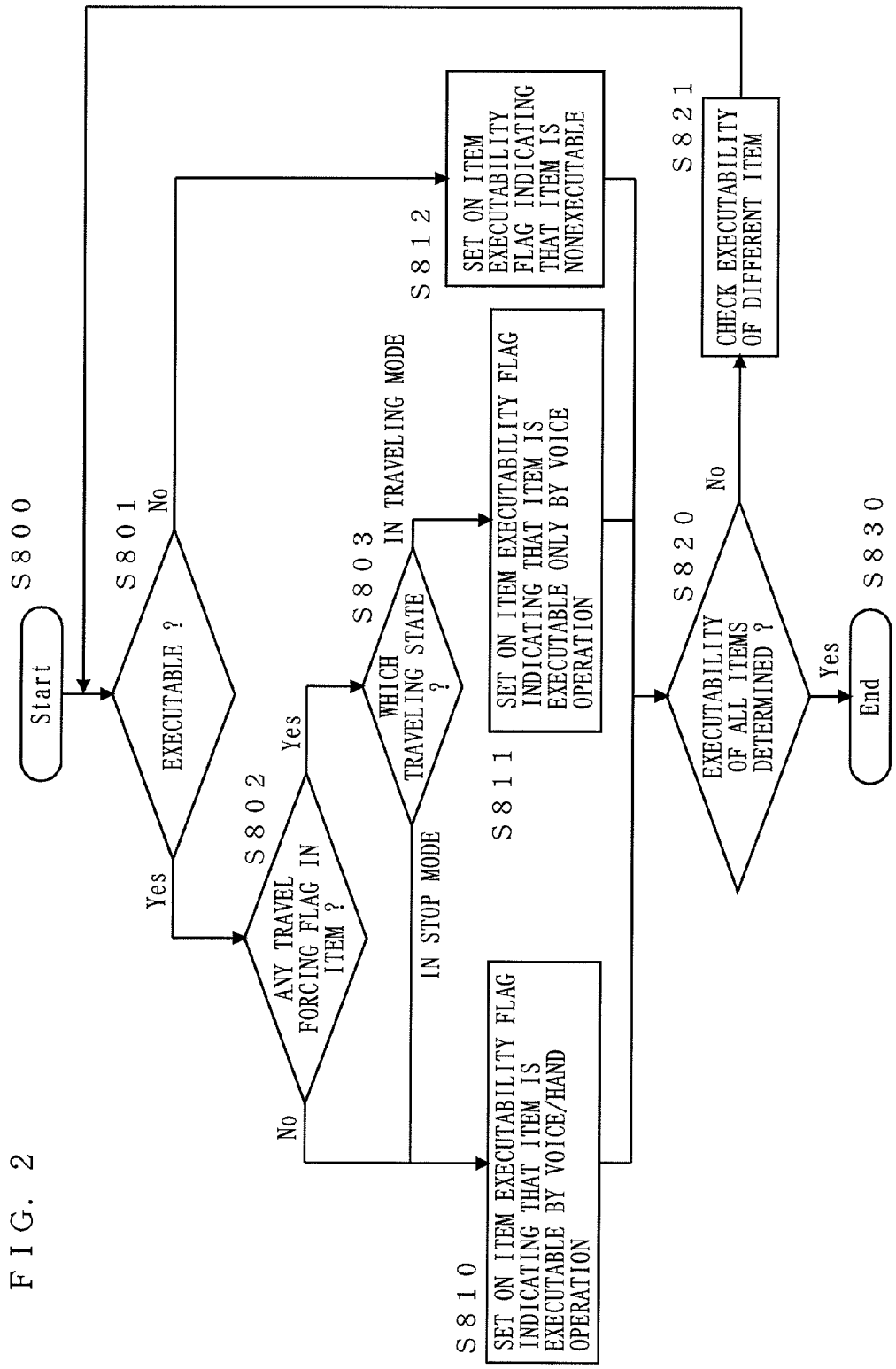
FIG. 2 is a flowchart showing a flow to determine whether or not an item in a menu is executable.

With reference to FIG. 2, a flow of processing of the item executability determination section 800 will be described. First, the item executability determination section 800 checks the logic-of-functions determination flag received from the logic-of-functions determination section 700 (step S801).

In step S801, when the logic-of-functions determination flag is set to "non-executable", which indicates that execution of an item is not executable even if any input is made, the item executability determination section 800 performs processing for setting the item executability flag to "item non-executable" (step S812). On the other hand, in step S801, when the logic-of-functions determination flag, which is received from the logic-of-functions determination section 700, is set to "executable", the item executability determination section 800 determines whether or not the item has a compulsory flag being set on (step S802). The compulsory flag is added to those items whose executability is determined depending on whether the vehicle is stopping or traveling. For example, in the car navigation, an item "return home" is executable by pressing one button, and thus the item can be executed regardless of whether the vehicle is traveling or stopping. To the item like this, the compulsory flag is not added.

In step S802, when the compulsory flag is not added to an item, which indicates that the item is executable with any input, and thus the item executability determination section 800 performs processing for setting the item executability flag to "item executable" (step S810). On the other hand, in step S802, when the compulsory flag is set on, the item executability determination section 800 checks the traveling state of the vehicle (step S803).

In step S803, when the traveling state received from the traveling state determination section 600 is in the "stop mode", the item executability determination section 800 advances the processing to step S810. On the other hand, in step S803, when the traveling state received from the traveling state determination section 600 is in the "travel mode", which indicates that the item is executable only by the voice operation, then the item executability determination section 800 performs processing for setting the item executability flag to "item executable only by voice operation" (step S811).

When the item executability flags are set on in steps S810, S811 and S812, the item executability determination section 800 determines whether or not the item executability flags have been added to all the items (step S820).

In step S820, when it is determined that the item executability flags have yet to be added to all the items, the item executability determination section 800 returns to step S801, whereas when it is determined that such addition to all the items has been performed, the processing ends. The item executability flags are outputted to the item execution determination section 900 and the display content generation section 1000.

Figure 3:
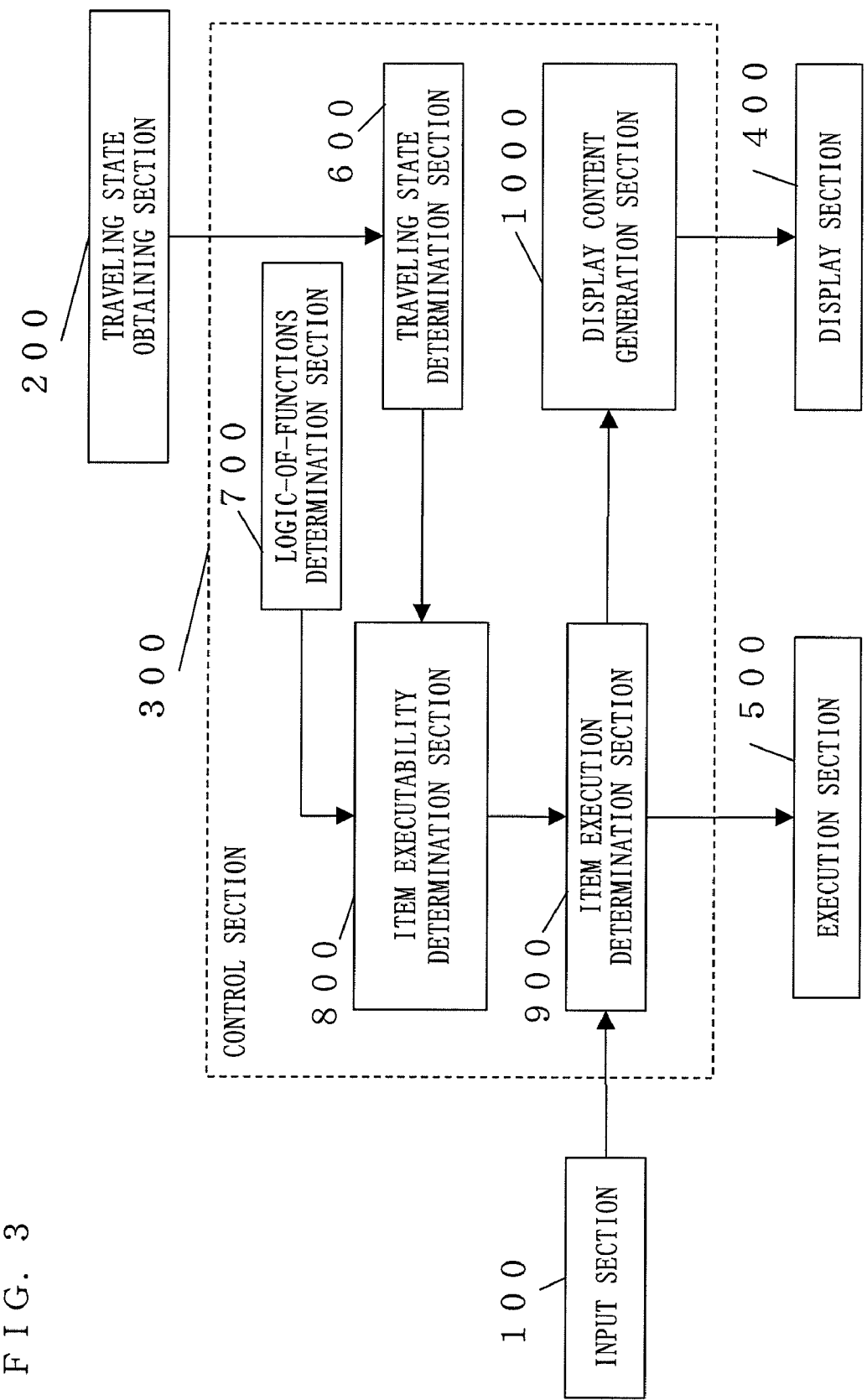
FIG. 3 shows a block diagram showing a configuration in which an input section of one embodiment of the present invention is included.
Figure 4:
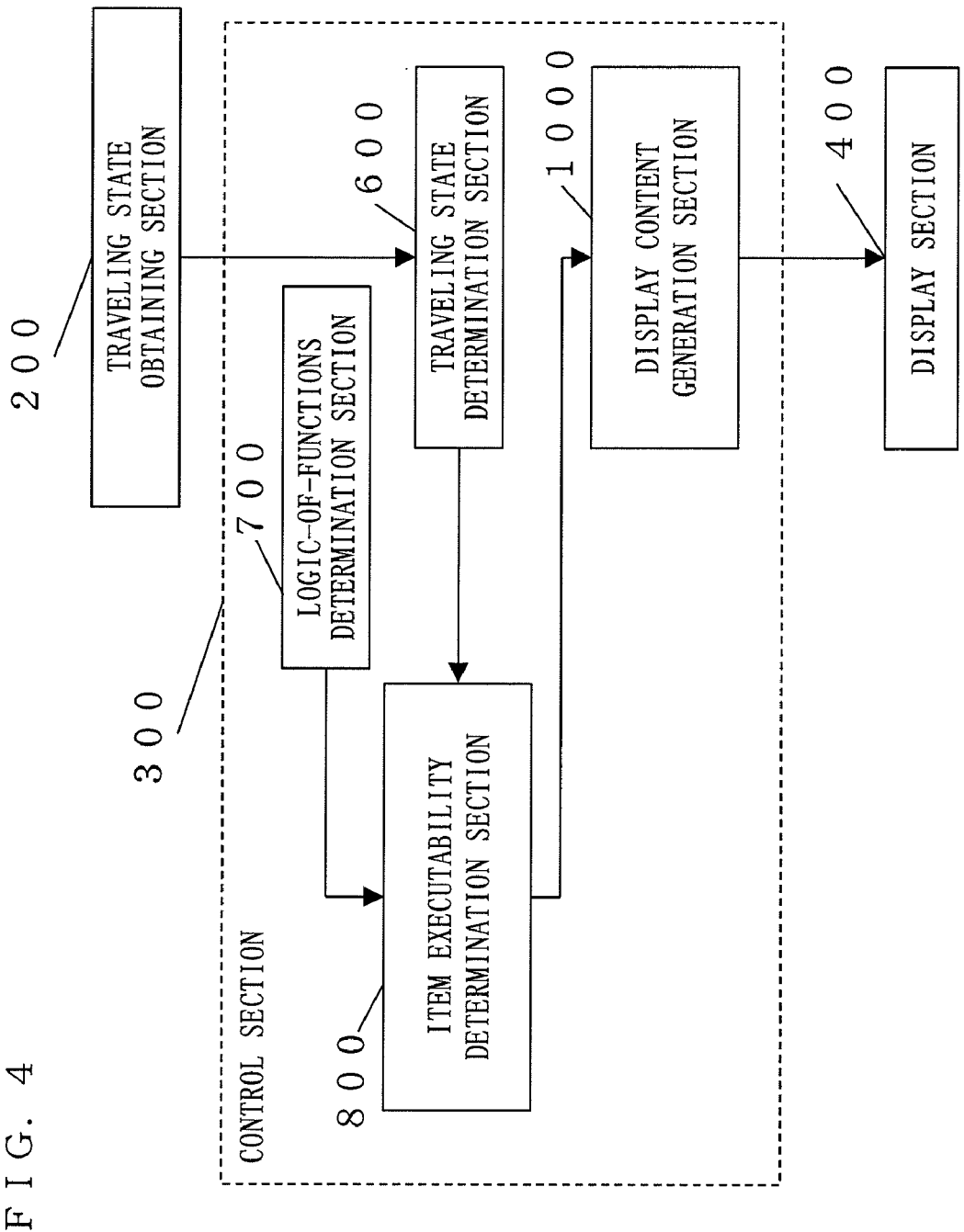
FIG. 4 is a block diagram showing a configuration in which the input section of one embodiment of the present invention is not included.

For the convenience of the description of the present embodiment, FIG. 1 is divided into FIG. 3 and FIG. 4. FIG. 3 is a block diagram in the case where the item executability determination section 800 shown in FIG. 1 does not directly output the item executability flags to the display content generation section 1000. FIG. 3 is a diagram illustrating a configuration in which an input from the input section 100 is outputted to the item execution determination section 900, and in which the display content generation section 1000 generates a display content mainly in accordance with a signal from the input section 100. FIG. 4 is a diagram which is obtained by eliminating the input section 100, the item execution determination section 900 and the execution section 500 from FIG. 1. FIG. 4 is a block diagram for illustrating a display content generated by the display content generation section 1000 regardless of the signal from the input section 100.

First, the configuration of FIG. 3 will be described. The item execution determination section 900 receives the signal from the input section 100 and the item executability flag from the item executability determination section 800. As the signal from the input section 100, a touched position coordinate point on the touch panel is inputted in the case of the input by the hand operation, whereas a voice signal is inputted in the case of the input by the voice operation. In the present embodiment, the touch panel is considered as a device for the hand operation. However, a remote control and an escutcheon switch, which is fixed on the periphery of the device, may be applicable and by pressing switches thereof, an item having been selected may be outputted to the item execution determination section 900 from the input section 100. Based on the received information, the final item executability flag is set on, and the flag information is outputted to the execution section 500. The final item executability flag and the selected item information are outputted to the display content generation section 1000.

Figure 5A:
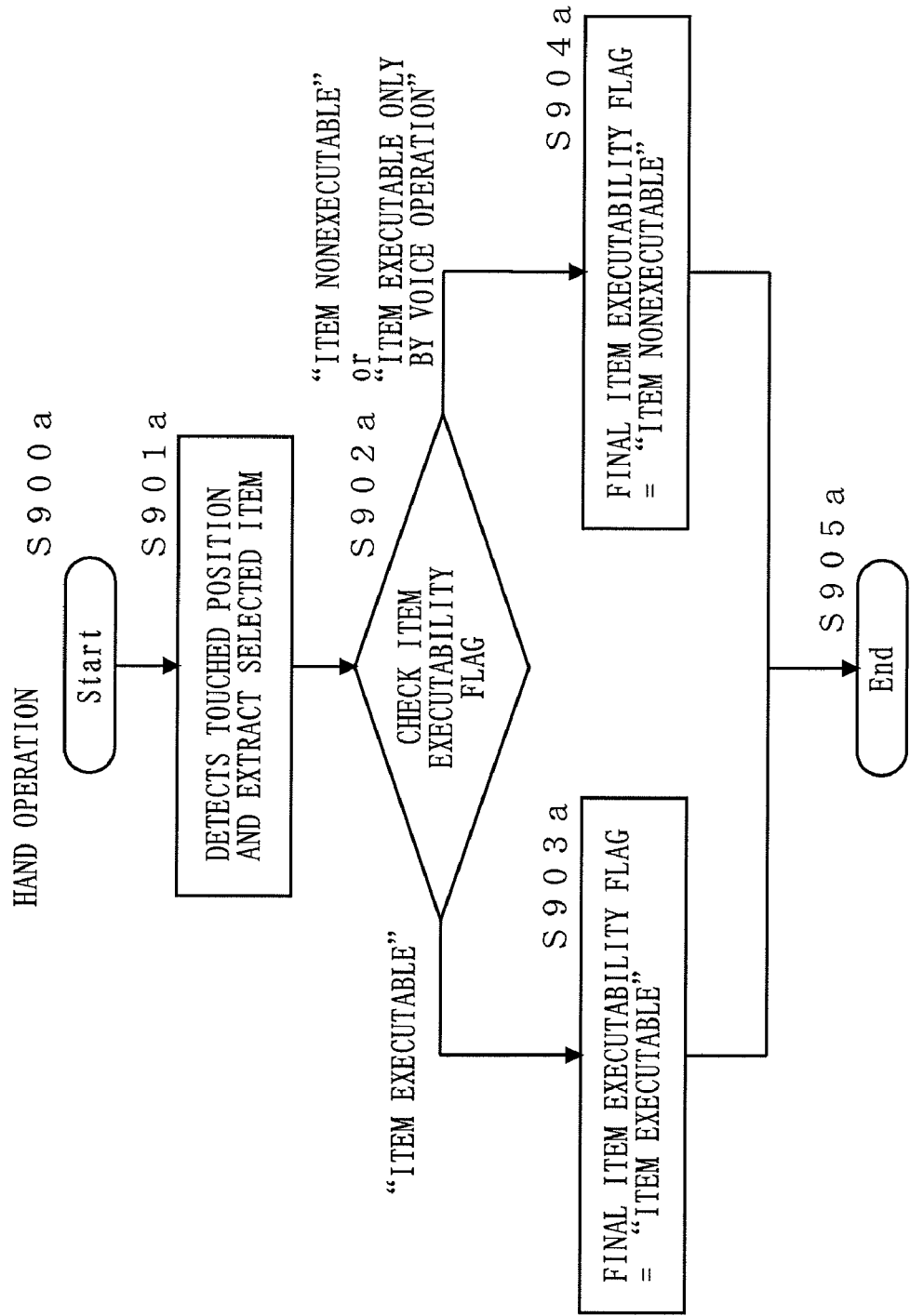
FIG. 5a is an operation flow chart showing, when an item is selected by a hand operation, whether or not the item is executable.

A flow of processing of the item execution determination section 900 in the case where the input from the input section 100 is performed by the hand operation will be described with reference to FIG. 5a.

In accordance with the touched position coordinate point having been inputted in step S901a, the item execution determination section 900 extracts an item corresponding to the touched position coordinate point. The item execution determination section 900 determines a type of the item executability flag to be added to the item extracted in step S902a, from among three types of "item executable", "item non-executable" and "item executable only by voice operation". When the flag added to the extracted item is set to "item non-executable" or "item executable only by voice operation", the item execution determination section 900 does not execute the item. In this case, the item execution determination section 900 sets the final item executability flag to "item non-executable" (step S904a), and ends the processing (step S905a). When the flag added to the extracted item is set to "item executable", the item execution determination section 900 sets the final item executability flag to "item executable" (step S903a), and ends the processing (step S905a). The execution section 500 executes the item selected by the input section 100 in accordance with the final item executability flag. The display content generation section 1000 inputs therein the item selected by the input section 100, the touched position corresponding thereto and the item executability flag, and creates the display content so as to be outputted to the display section 400.

A case will be described where the item executability flag set to "item executable" is inputted to the display content generation section 1000. In this case, in order to execute the selected item, the selected item is toned up, and a display proceeds to a next hierarchical screen or proceeds to a screen to execute a final function. The final function indicates an item shown at the bottom end of the menu hierarchies, and is an item for executing a predetermined function. For example, in the case of the car navigation, suppose the hierarchical menu represents "destination"→"periphery search"→"convenience store"→"via-point setting". The "via-point setting" is considered as a command, and plays a role of searching a convenience store near the current location, and then sets the convenience store as a via-point.

Figure 6:
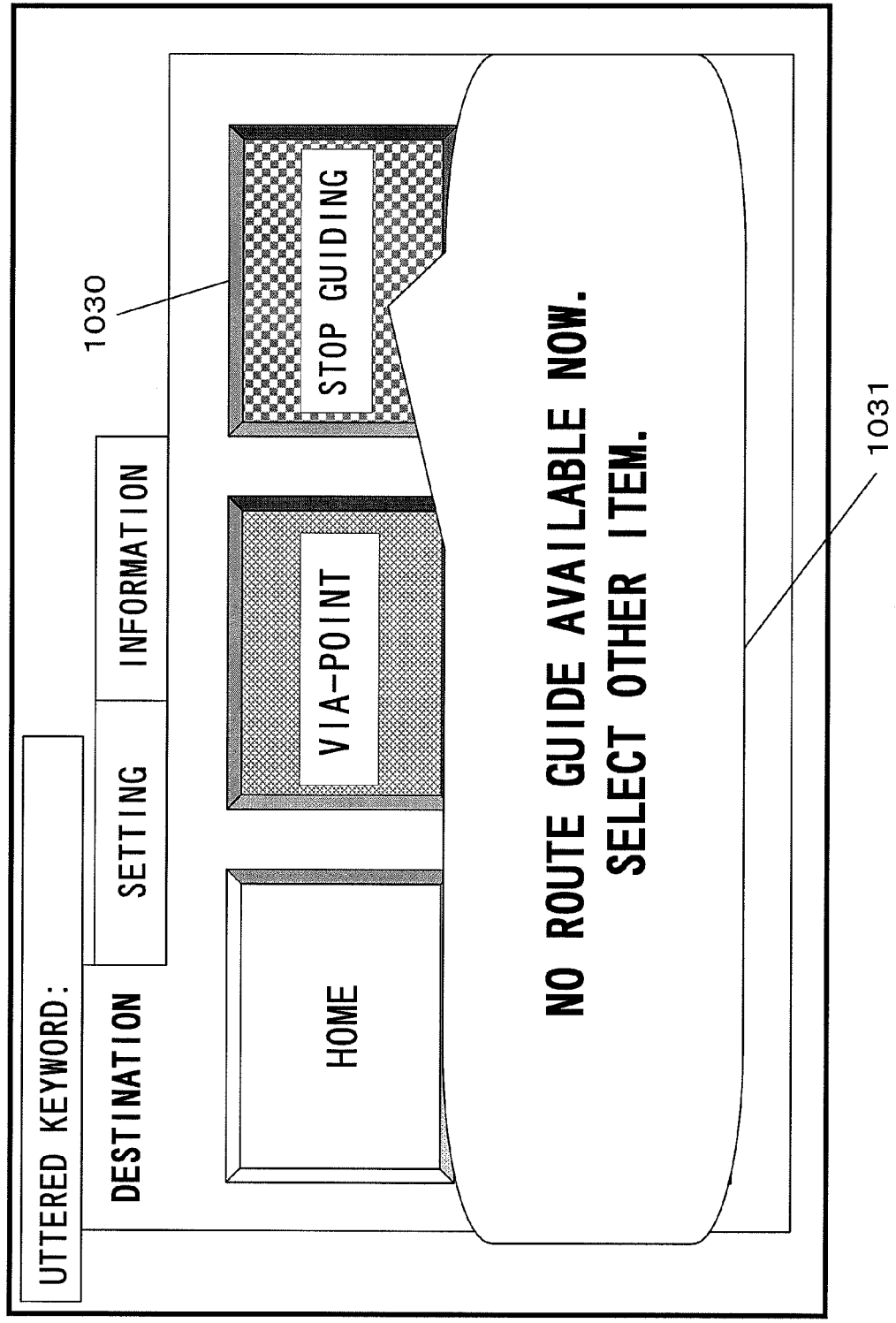
FIG. 6 is a diagram showing an exemplary display content when an item is not executable.

A case will be described where the display content generation section 1000 sets the item executability flag to "item non-executable". In this case, since a function of the selected item is non-executable, a display content for notifying the user is generated. With reference to FIG. 6, suppose that an item 1030 "stop guiding" is selected while the route guide is being not performed. In this case, a flag set to "item non-executable" is added to the item 1030 "stop guiding", and thus a pop-up 1031 (for displaying a content as a reminder or the like in a display area newly created), which indicates that the item 1030 is to be used while the route guide is performed, is used as a notification to the user. Also when the CPU is in a processing state and does not accept any input temporarily, for example, in the case of an input standby state, a display is performed so as to notify the user of such. Accordingly, the user notices that a wrong item has been selected, or notices that the device is in the input standby state. At the same time, in consideration of the touched position, a word balloon from the selected item to be displayed may be generated, and then the selected item may be indicated therein. Further, brightness, a color tone, a font style and a character size may be changed so as to highlight the selected item 1030.

Figure 7:
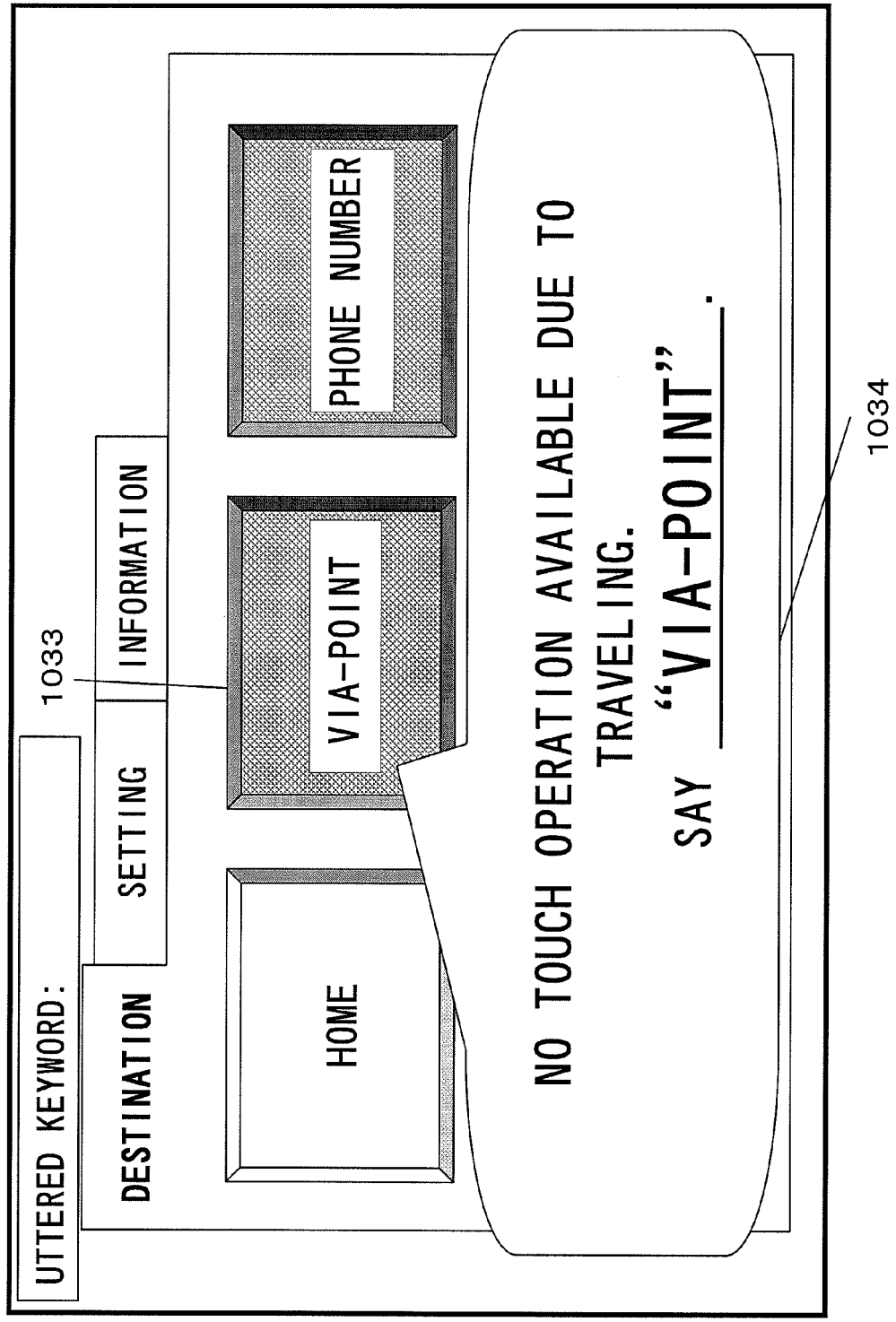
FIG. 7 is a diagram showing an exemplary case where an item, which is executable only by the voice operation, is selected by the hand operation.
Figure 8:
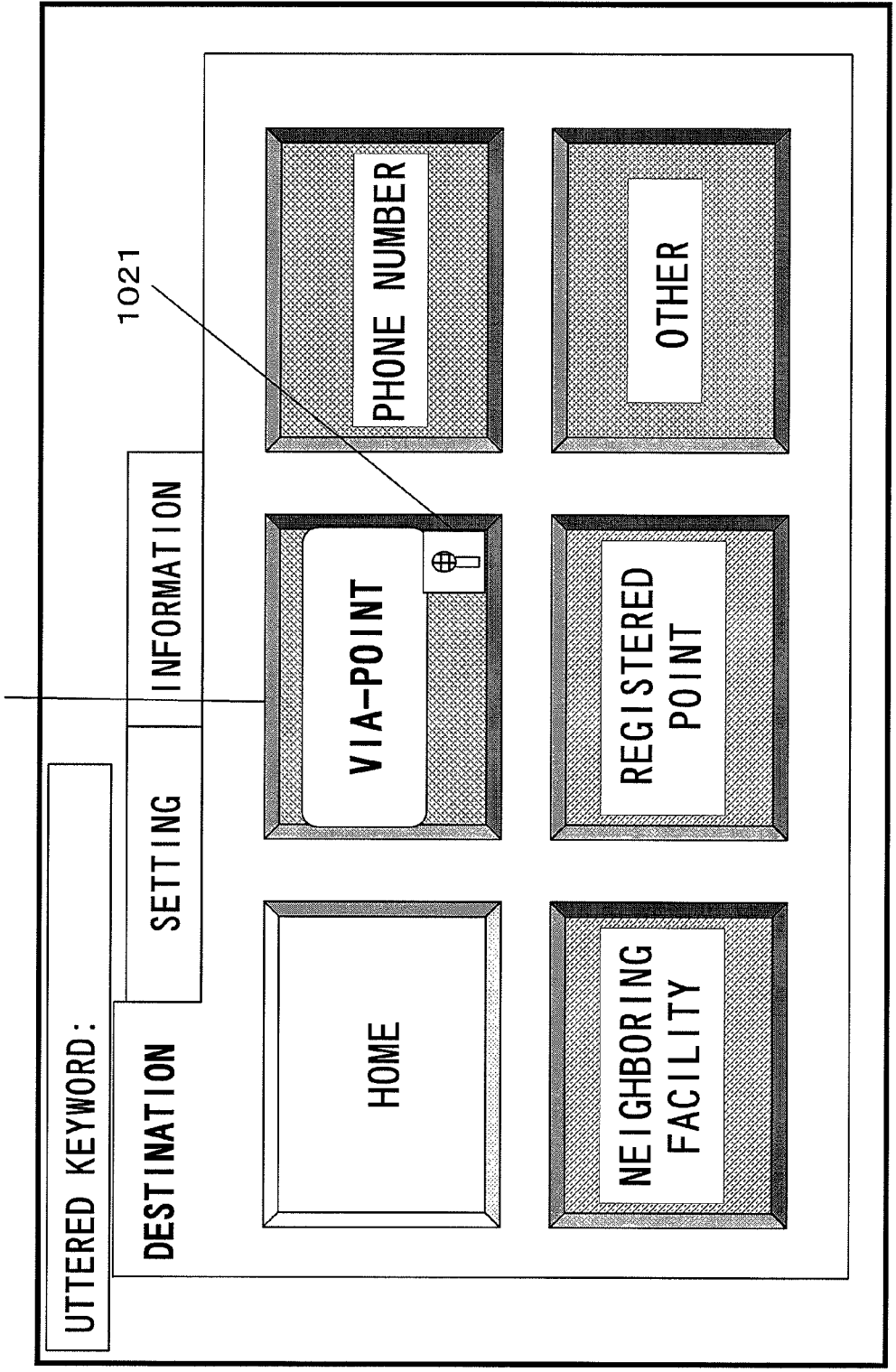
FIG. 8 is a diagram showing an exemplary case where the item, which is executable only by the voice operation, is selected by the hand operation.

A case will be described where the item executability flag is set to "item executable only by voice operation". In this case, only a voice input operation is accepted, and thus an item cannot be executed. That is, any voice input can cause the item to be executed, and thus a display content to notify such to the user is created. With reference to FIG. 7, suppose that the user selects the item 1033 "via-point" in order to set the via-point during traveling, for example. In this case, the item 1033 "via-point" only accepts the voice input operation. Therefore, a word balloon 1034 is used to notify that the hand operation is prohibited, and to urge the user to perform the voice input operation. At the same time, a word-to-be-uttered as the voice input operation is notified. Accordingly, the user understands the way to utter the item, and thus the user can easily switch to the voice operation. Further, the word-to-be-uttered may be enlarged, or alternatively, the word-to-be-uttered may be enclosed with angle brackets. Further, in consideration of the touched position, the word balloon is shaped and displayed so as to be blown out from the selected item, whereby the user can confirm the selected item. FIG. 8 shows an example in which, instead of the word balloon being used, the selected item 1035 is highlighted. An icon 1021 indicating that the selected item only accepts the voice input is created and displayed. Accordingly, since any other character string than the word-to-be-uttered is not displayed, the user does not need to read many characters during traveling, and thus can drive safely. Further, the icon is displayed, whereby it is possible to notify the user that the item can be selected only by the voice input. Further, a color of a character string "via-point", and a color of a background of the item 1035 are clearly differentiated from each other, whereby the character string becomes legible. Still further, the item may be highlighted by applying thereto phonetic transcriptions in kana in order to encourage the user to perform the voice input.

Figure 5B:
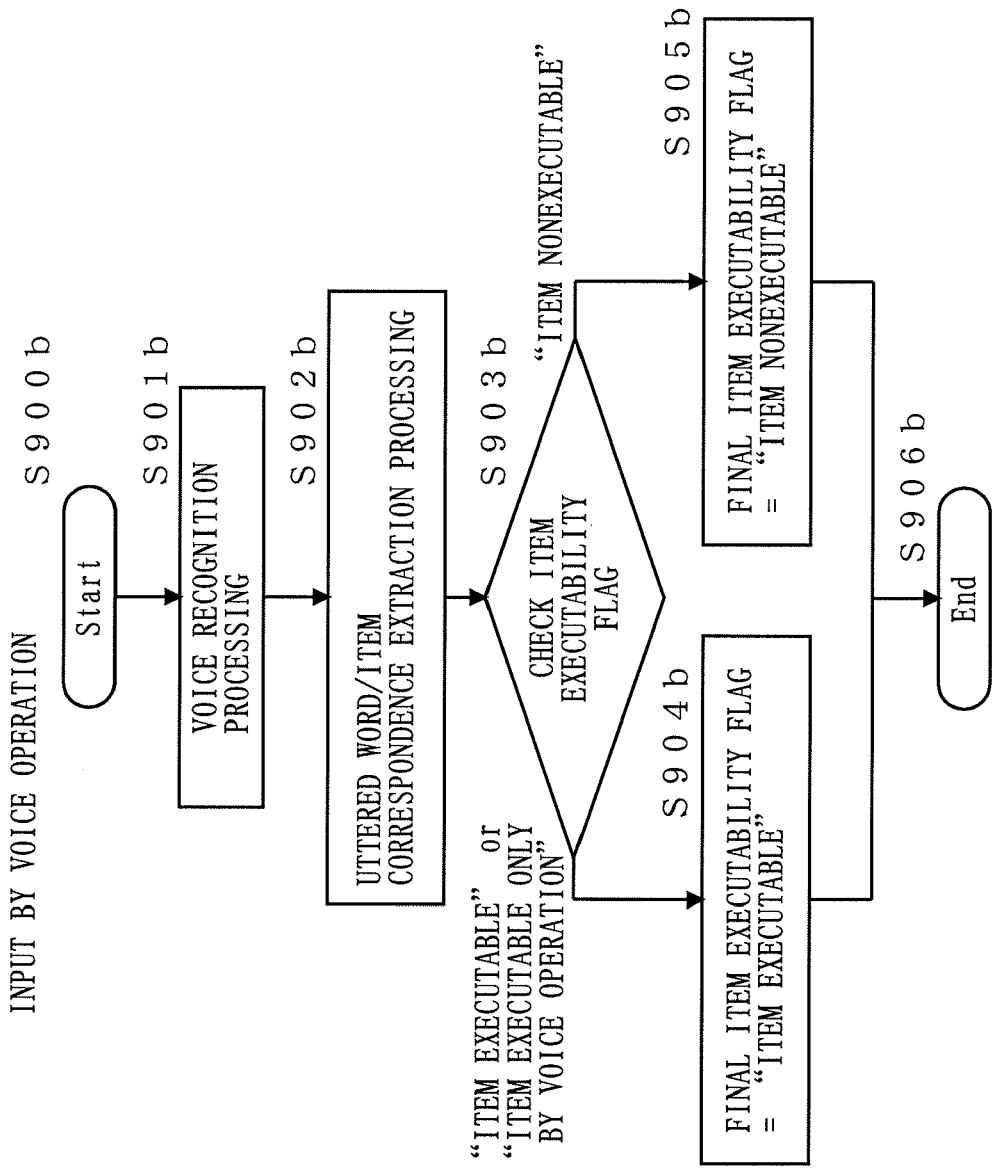
FIG. 5b is an operation flow chart showing, when an item is selected by a voice operation, whether or not the item is executable.

With reference to FIG. 5b, a basic flow of processing of the item execution determination section 900 will be described in the case where the input from the input section 100 is performed by the voice operation. The item execution determination section 900 performs voice recognition processing on the uttered word inputted in step S901b so as to find a word corresponding thereto from a dictionary previously arranged. As the voice recognition processing, a hidden Markov model (HMM), which is a generally known probability statistics model, or the like is used. As the voice recognition processing, continuous voice recognition processing may be used in which a plurality of uttered vocabularies are recognized, and the voice recognition is performed by differentiating the uttered vocabularies from each other. As the continuous recognition processing technique, a technique already known to public is used. The item execution determination section 900 then extracts an item corresponding to the uttered word (step S902b).

Figure 17:
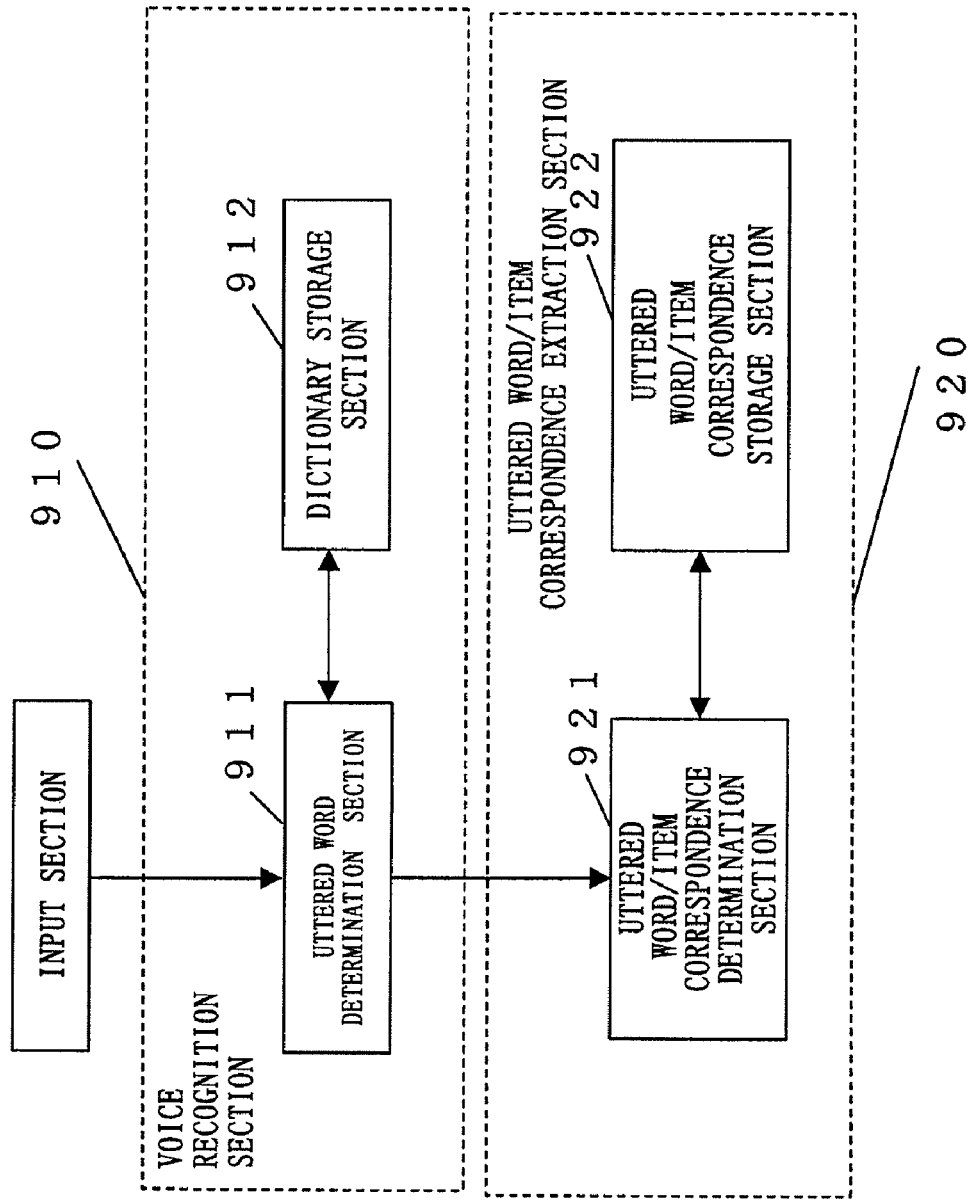
FIG. 17 is a block diagram showing a configuration for selecting items by the voice operation.
Figure 18:
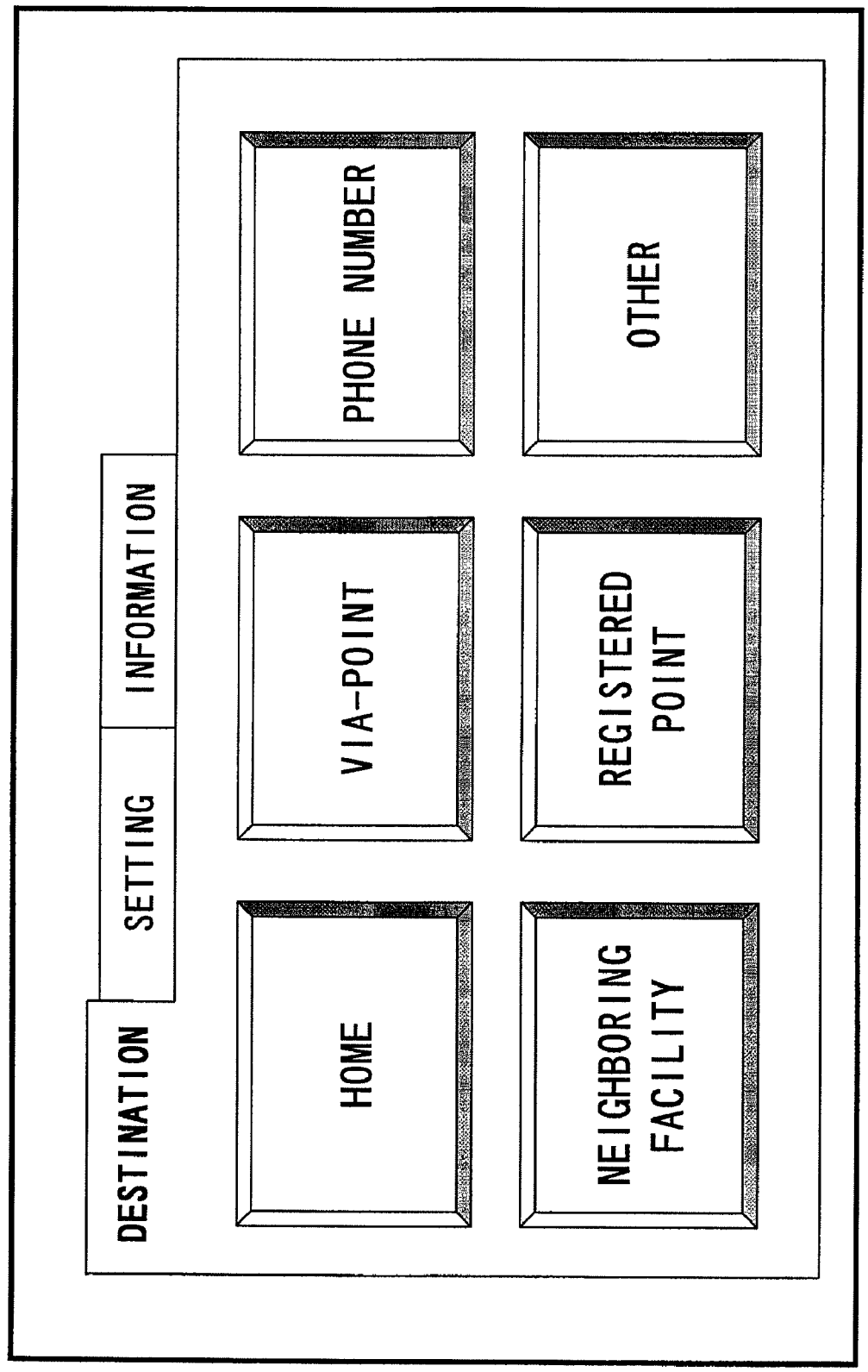
FIG. 18 is a diagram showing an exemplary conventional display content during vehicle stopping.
Figure 19:
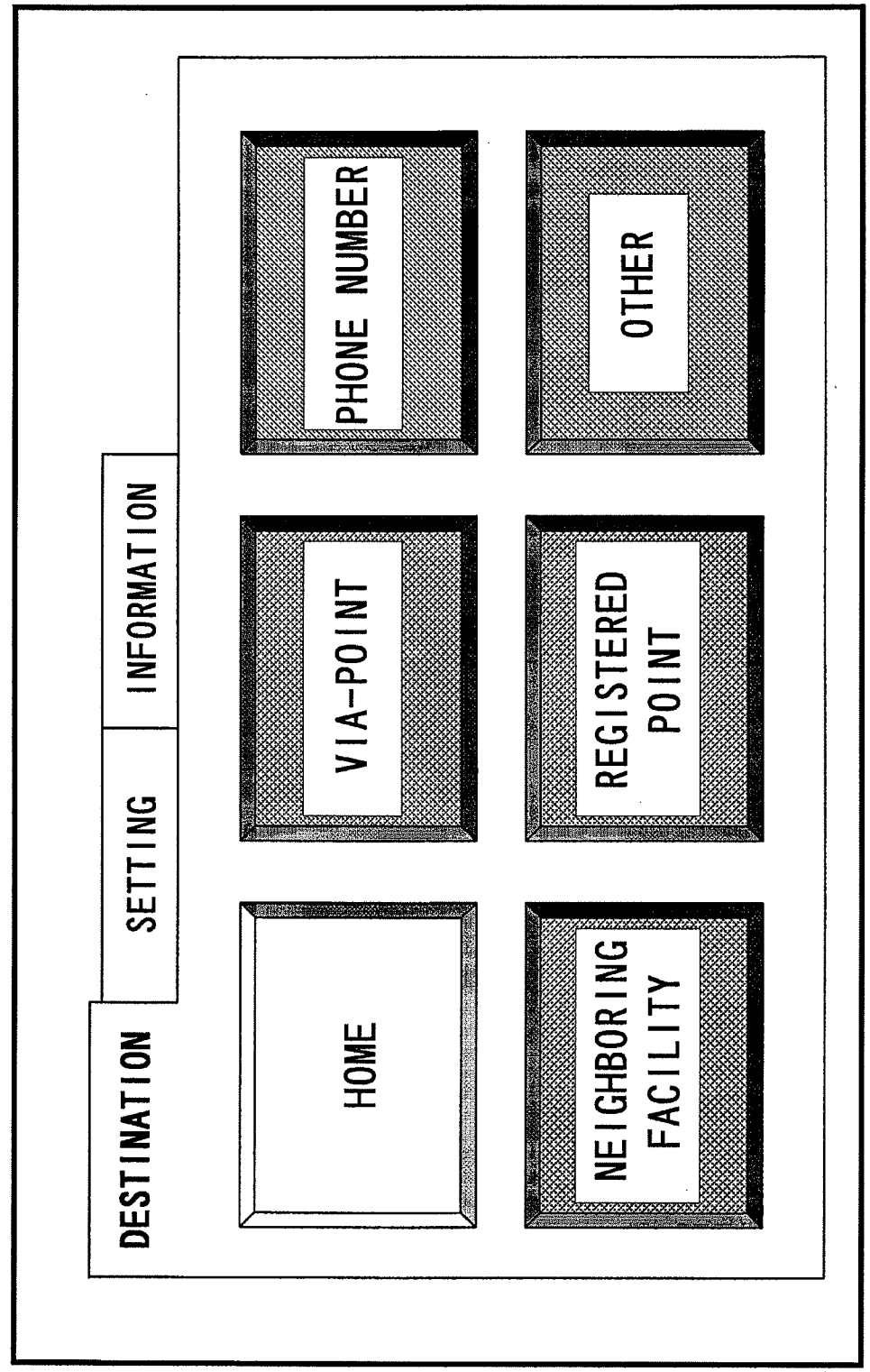
FIG. 19 is a diagram showing an exemplary conventional display content during vehicle traveling.

FIG. 17 will be described in detail, which shows a block diagram of the voice recognition processing in step S901b and item extraction in step S902b. The voice recognition section 910 receives the uttered word from the input section 100. The received uttered word is forwarded to the uttered word determination section 911. The uttered word is then matched with a word stored in the dictionary storage section 912, and a most likely word is outputted to an uttered word/item correspondence extraction section 920. The uttered word/item correspondence determination section 921 determines an item corresponding to the inputted uttered word, with reference to an uttered word/item correspondence storage section 922, and the processing ends. After the corresponding item is extracted, the item executability flag of the item is checked. In the case where the item executability flag is set to "item executable" or "item executable only by voice operation", the final item executability flag is set to "item executable". In the case where the item executability flag is set to "item non-executable", the final item executability flag is set to "item non-executable", and then the processing ends. The execution section 500 performs execution processing in accordance with the final item executability flag added to the item selected by the item execution determination section 900.

Figure 9B:
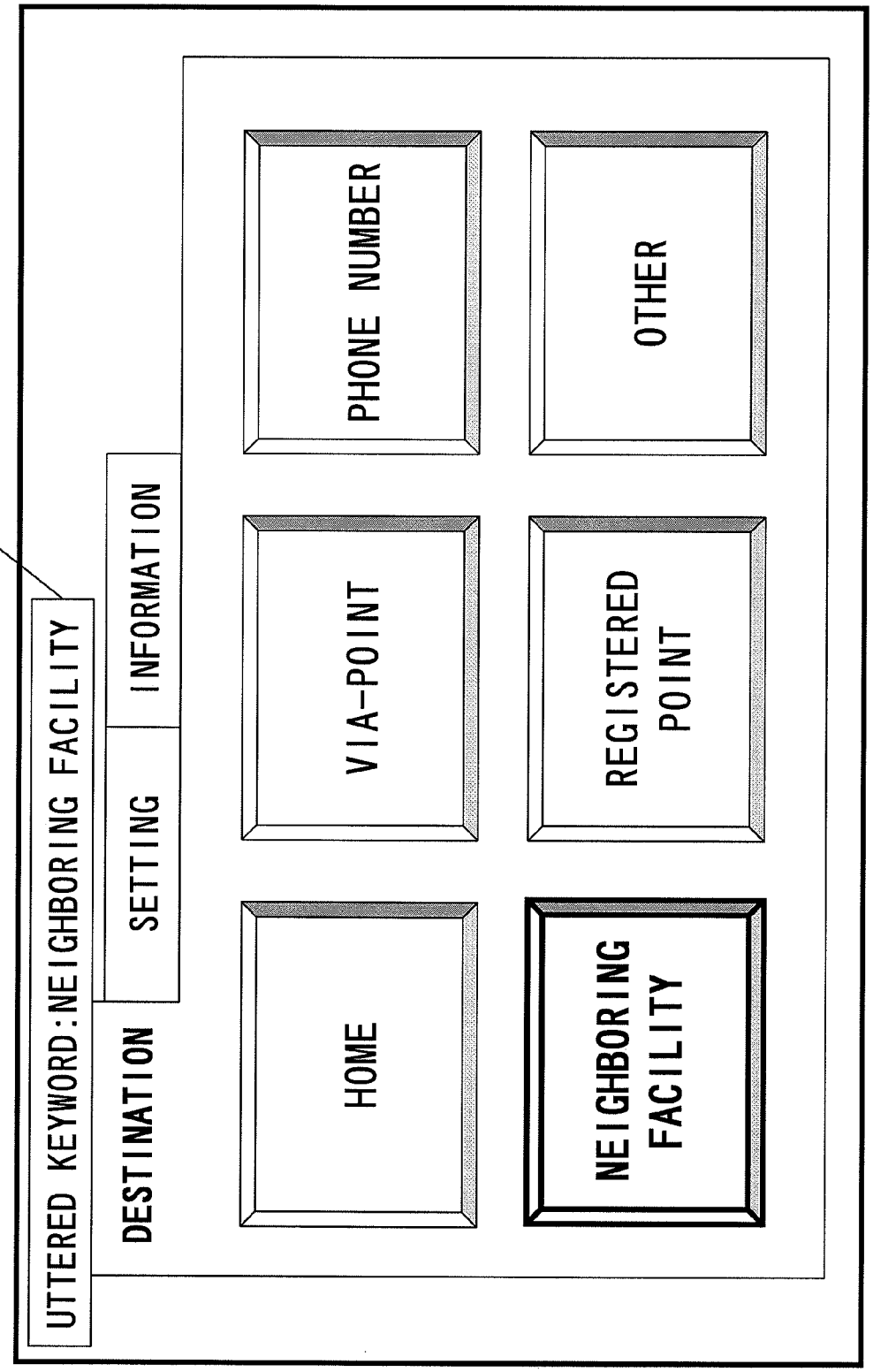
FIG. 9b is a diagram showing an exemplary case where item selected by the voice operation is highlighted.
Figure 11:
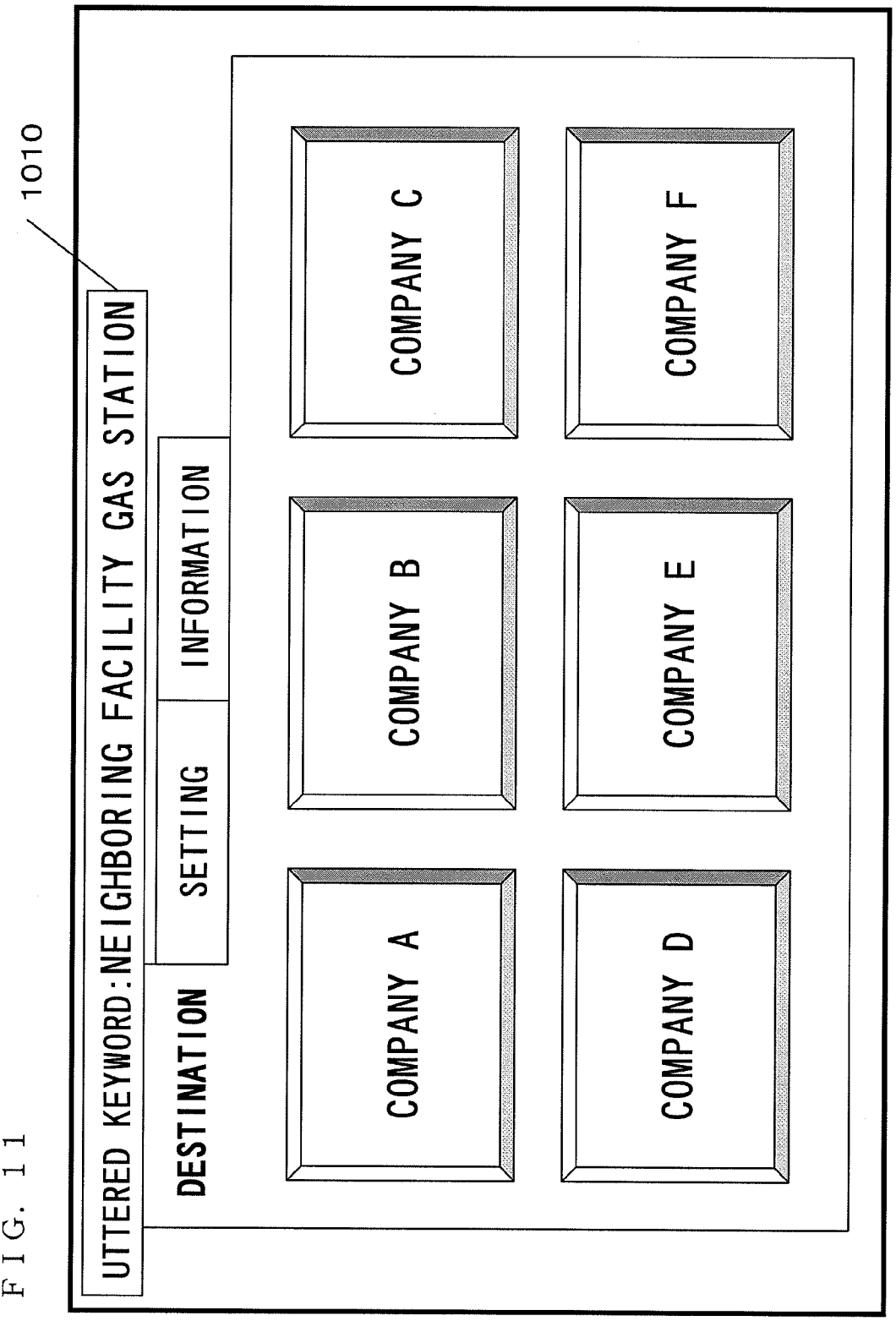
FIG. 11 is a diagram showing an exemplary case where the word uttered in the voice operation is displayed.

With reference to FIGS. 9a and 9b, a screen display in the case where the item executability flags are set to "item executable" and "item executable only by voice operation" will be described in detail. The display content generation section 1000 receives the selected item and the item executability flag, generates a display content, and outputs the generated content to the display section 400. FIG. 9a shows a screen display before a voice input. The uttered word display section 1010 is provided previously, on which an uttered word is displayed as characters. When the user makes an utterance, a result of the voice recognition processing is displayed on the uttered word display section 1010. A case where "neighboring facility" has been uttered is shown in FIG. 9b. In this case, the "neighboring facility" is displayed in the uttered word display section 1010, and the screen proceeds to a next screen. Note that the "neighboring facility" may be displayed on the uttered word display section 1010 after the screen proceeds to the next screen. As shown in FIG. 9b, when the item is selected, the item is highlighted so as to indicate such selection to the user, whereby the user can confirm an item to be executed. Next, as shown in FIG. 10, the screen proceeds to a screen in a hierarchy under the "neighboring facility". An utterance "gas station" is then made, and if the word recognized in the voice recognition processing is the "gas station", the "gas station" is displayed on the uttered word display section 1010. In this case, as shown in FIG. 11, the "gas station" may be displayed, while vocabularies having been uttered by the user are maintained as a history. By maintaining the vocabularies as the history, the user can check the hierarchies the user has navigated through. Accordingly, when the user needs to concentrate on the driving in the middle of the input operation to the device, the user can smoothly perform a remaining input operation later.

A case where the item executability flag is set to "item non-executable" will be described. The case is similar to the case of the hand input operation, since a function of the item is non-executable.

With reference to FIG. 4, a display content generated by the display content generation section 1000 in accordance with the information of the item having the item executability flag added thereto will be described, the item being received by the item executability determination section 800. FIGS. 12 to 16 each shows a case including all the items having added thereto the item executable/nonexectuable determination flags, which are set to "item executable", "item non-executable", and "item executable only by voice operation", respectively. The item 1001 representing "home" is set to "item executable", the items 1002, 1003, 1004 and 1005 representing the "via-point", a "phone number", the "neighboring facility" and a "registered point", respectively are set to "item executable only by voice operation", and the item 1006 representing "stop guiding" is set to "item non-executable".

Figure 12:
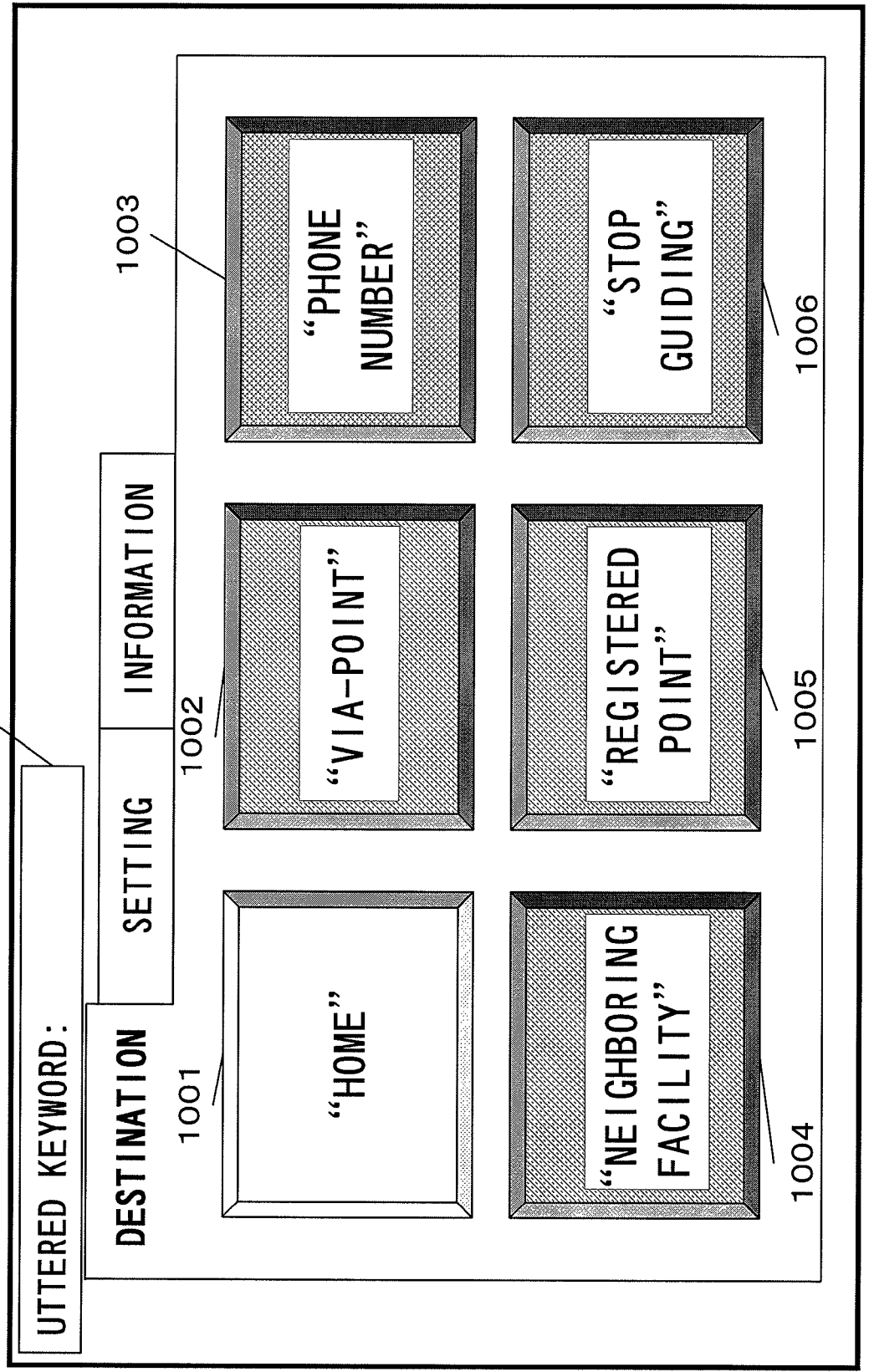
FIG. 12 is a diagram showing an exemplary display content of items executable by the voice operation.

FIG. 12 shows a case where names of the items 1001, 1002, 1003, 1004 and 1005, which are the items executable by the voice operation, are each enclosed with angle brackets, and the items 1002, 1003, 1004 and 1005, which are the items non-executable by the hand operation, are each displayed in a toned-down manner. Enclosing the name of the item with the angle brackets indicates that an utterance thereof is acceptable, and thus a state of being executable by the voice operation can be presented to the user without generating a complicated display. In addition, the angle brackets can provide the user with a clue indicating that the items can be selected by uttering the displayed character string.

Figure 13:
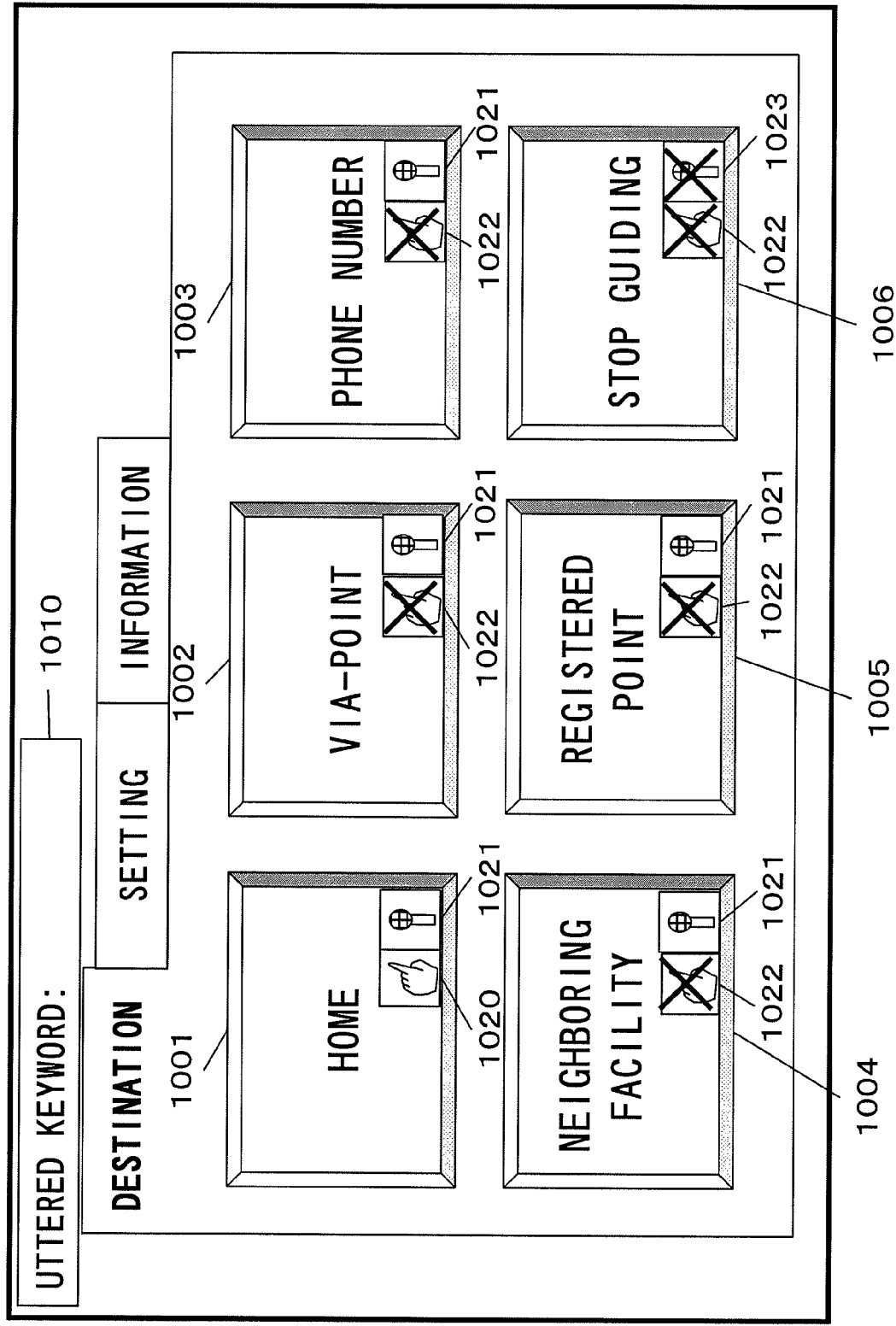
FIG. 13 is a diagram of an exemplary display content showing whether items are executable by the voice operation and the hand operation.

FIG. 13 shows a case where items being executable by the voice operation and the hand operation are indicated by symbol marks 1020 and 1021, respectively. In the case of the items non-executable, symbol marks 1022 and 1023, which respectively have x marks added, are displayed. In this case, designs of the items are not changed, but only symbol marks smaller than the respective items need to be added. Compared to the processing for toning down color tones of the items, the processing for adding the x mark is simpler, and in addition, the data amount can be kept smaller. Still further, the user intuitively understands that the symbol marks having the x marks do not accept inputs. Instead of adding the x mark to the symbol mark, a case where the symbol mark is not displayed, or a case where the symbol mark is displayed in a toned down manner may be assumed.

Figure 14:
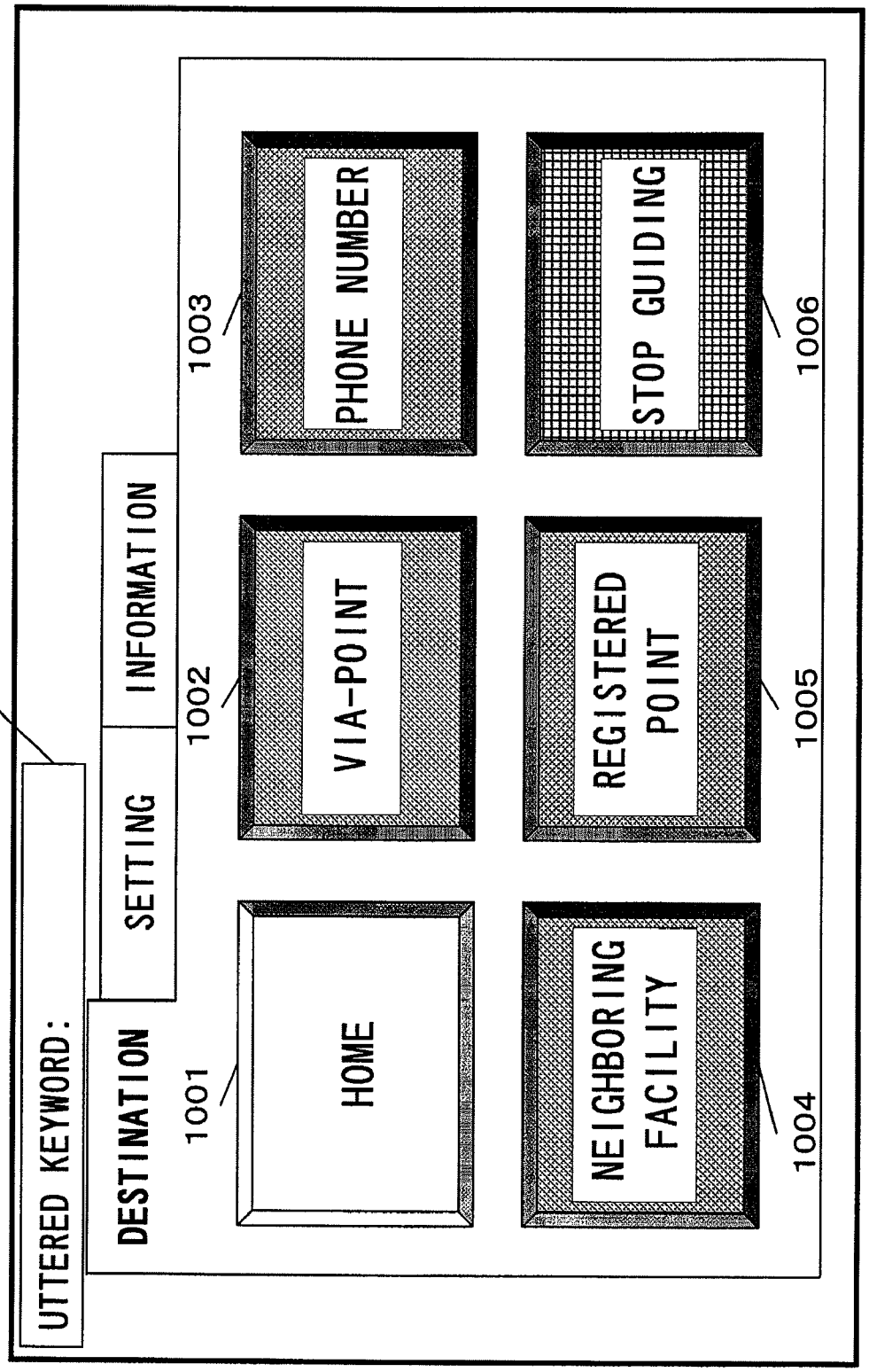
FIG. 14 is a diagram of an exemplary display content showing cases where items are selectable by the voice operation, where items are not selectable by the hand operation, and where items are not selectable by the voice operation or the hand operation.

FIG. 14 is an exemplary display where the items 1002, 1003, 1004 and 1005, which are items executable by the voice operation, are toned down so as to indicate that the items are not executable by the hand operation, and areas surrounding the names of the items, which are executable by the voice operation, are not toned down. Since the names of the items, which are executable by the voice operation, are not toned down, the names of the items is easily legible to the user. Accordingly, the user is not disturbed when the user reads and utters the names of the items, and then performs the input operation. Further, the item 1006 which is the item non-executable by the voice operation and the hand operation is toned down including the name of the item, whereby the name of the item becomes illegible, which causes the user to psychologically hesitate to utter the name of the item.

Figure 15:
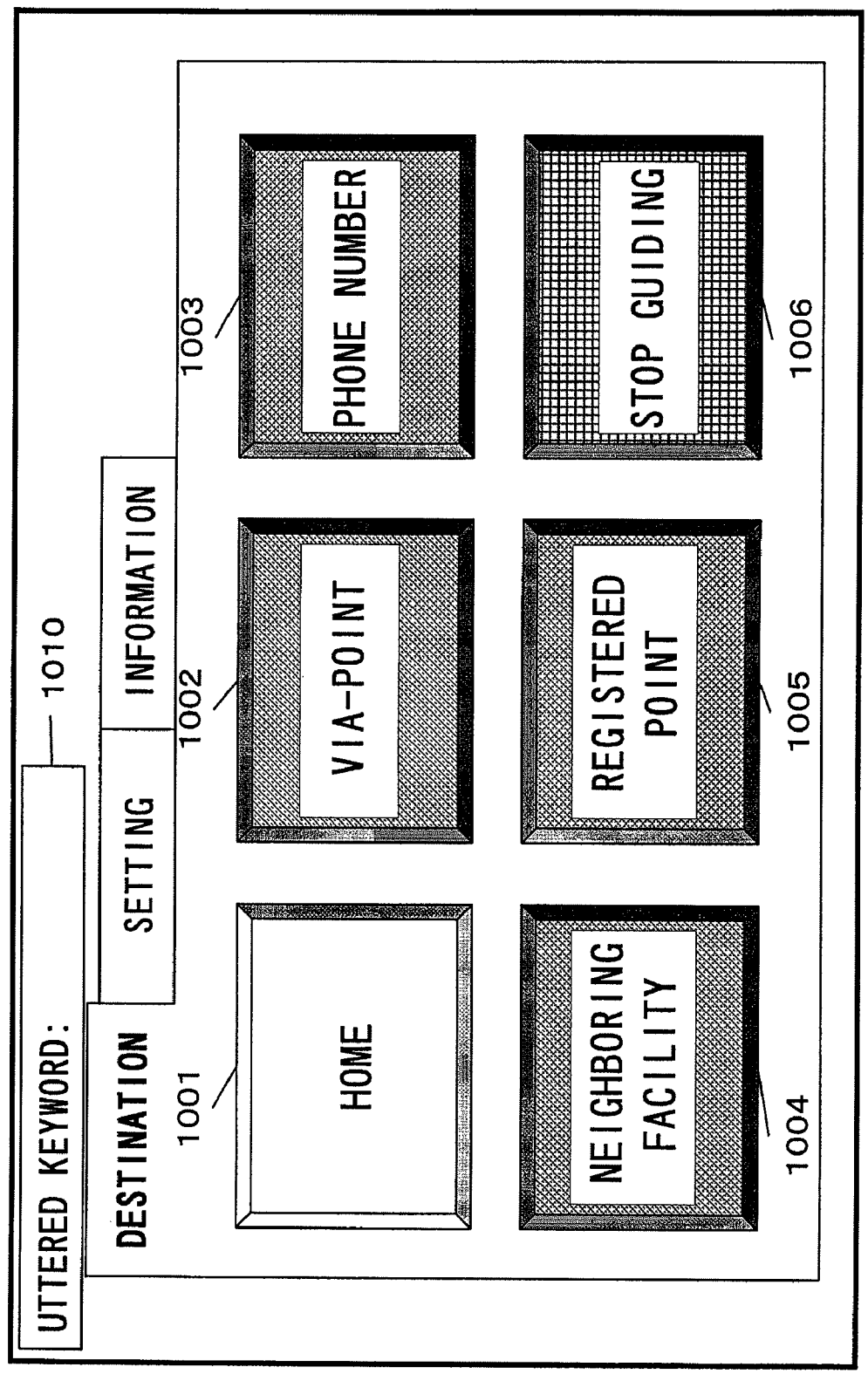
FIG. 15 is a diagram of another exemplary display content showing the cases where items are selectable by the voice operation, where items are not selectable by the hand operation, and where items are not selectable by the voice operation or the hand operation.

FIG. 15 shows an exemplary case where colors are respectively allocated to the item 1001 which is the item executable by the voice operation and the hand operation, the items 1002, 1003, 1004 and 1005 which are the items executable only by the voice operation, and the item 1006 which is the item non-executable. In this case, the user can easily view and confirm states of the respective items.

Figure 16:
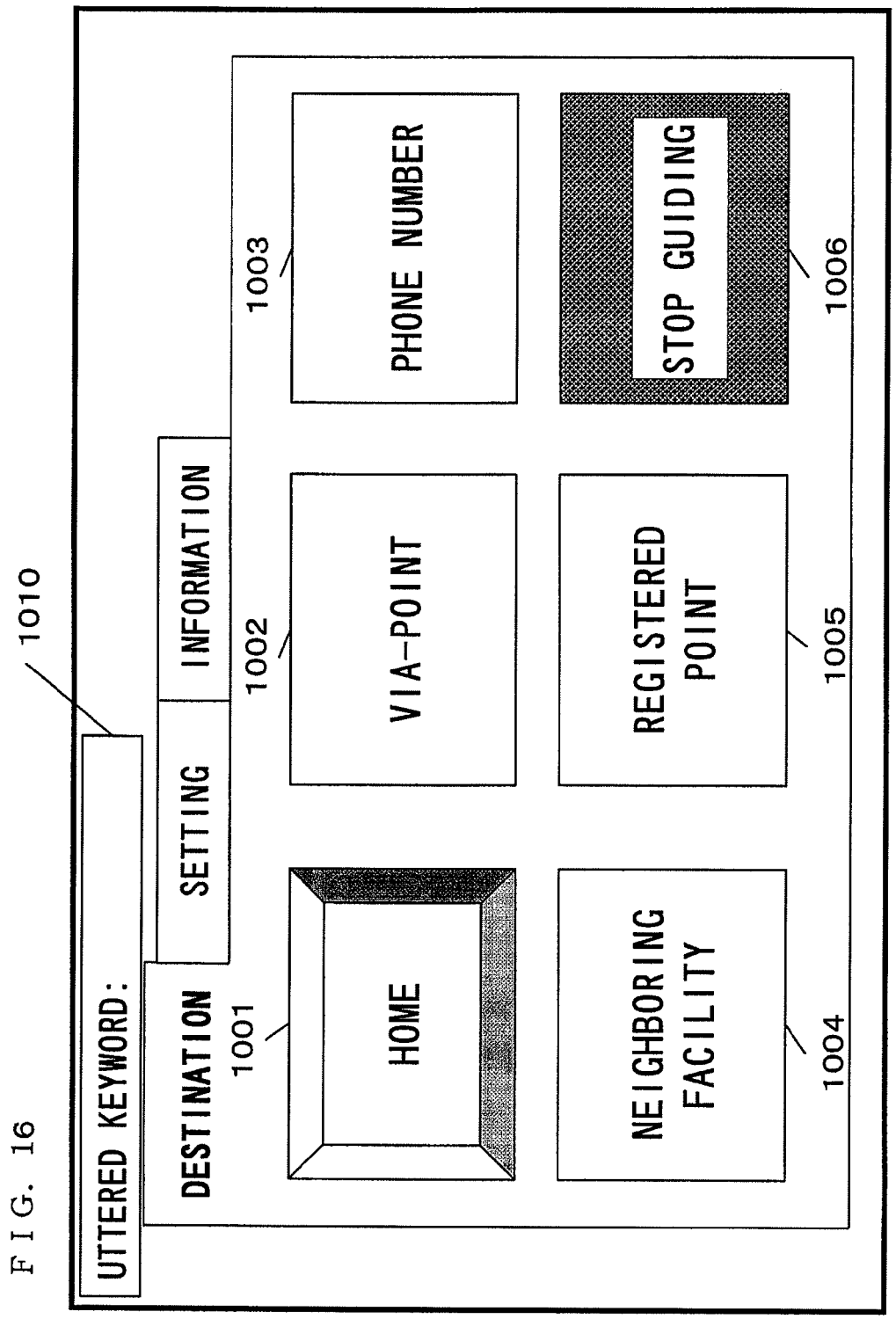
FIG. 16 is a diagram of another exemplary display content showing the cases where items are selectable by the voice operation, where items are not selectable by the hand operation, and where items are not selectable by the voice operation or the hand operation.

As shown in FIG. 16, the item 1001 which is the item executable by the voice operation and the hand operation are displayed three-dimensionally. The items 1002, 1003, 1004 and 1005 which are the items executable only by the voice operation are each displayed two-dimensionally. The item 1006 which is the item non-executable is displayed two-dimensionally and also toned down. Accordingly, items which are non-executable by the hand operation are distinguishable. In addition, the item which is non-executable at all is further easily understandable since the item is toned down. Note that examples shown in FIGS. 12 to 16 may be displayed in a combined manner.

The configurations described in the above-described embodiments merely show specific examples, and never limit the scope of the technique of the present invention in any way. Any configuration may be applicable within the scope of the effect of the present invention.

INDUSTRIAL APPLICABILITY

As above described, the input device for the mobile body according to the present invention is capable of previously showing the user whether an item, which is executable in accordance with a situation of the mobile body either in the travel mode or in the stop mode, can be executed by the voice operation or the hand operation, and thus is particularly useful as a device which is mounted to the mobile body and which allows an input operation on a menu structured in a hierarchical format.

The invention claimed is:

1. An input device for a mobile body, the input device comprising:
   an input section for receiving inputs by a hand operation and by a voice operation;
   a traveling state determination section for determining a traveling state of the mobile body;
   an item executability determination section for determining, in the traveling state determined by the traveling state determination section, executability by the hand operation and executability by the voice operation of respective items which indicate functions operated by the inputs received by the input section;
   a display content generation section for generating, in accordance with a determination made by the item executability determination section, a display mode for each of the items such that the executability by the hand operation and executability by the voice operation thereof are distinguishably shown; and
   a display section for displaying each of the items in the display mode generated by the display content generation section.

2. The input device for the mobile body according to claim 1, further comprising
   an item execution determination section for determining whether or not to execute the input received by the input section, wherein
   the display content generation section generates a result of an operation caused by the input received by the input section in accordance with a content determined by the item execution determination section, and
   the display section displays the result of the operation generated by the display content generation section.

3. The input device for the mobile body according to claim 2, wherein in a case where an item is non-executable by the voice operation, the item execution determination section eliminates a word in a dictionary for the voice operation, the word corresponding to the item, from search targets in voice recognition processing.

4. The input device for the mobile body according to claim 2, wherein the display content generation section generates a display content so as to display a word used by the voice operation and/or a word of an item selected by the hand operation as a history.

5. The input device for the mobile body according to claim 1, wherein in a case where a function of an item is non-executable, the item executability determination section determines that the item is non-executable either by the hand operation or by the voice operation.

6. The input device for the mobile body according to claim 1, wherein the display content generation section generates a display mode which distinguishably shows a case where an item is executable by the voice operation only and a case where the item is executable by the hand operation and the voice operation.

7. The input device for the mobile body according to claim 6, wherein the display content generation section generates a display content so as to indicate, by using a display mode in which characters of the item are highlighted, that the item which is executable by the voice operation.

8. The input device for the mobile body according to claim 6, wherein the display content generation section generates a display content so as to indicate that the item is executable by the hand operation and by the voice operation by using symbol marks of the respective hand and voice operations.

9. The input device for the mobile body according to claim 1, wherein the display content generation section generates a display mode which distinguishably shows a case where an item is executable only by the voice operation, a case where the item is executable by the hand operation and the voice operation, and a case where the item is non-executable by the hand operation and the voice operation.

10. The input device for the mobile body according to claim 9, wherein the display content generation section generates a display mode for displaying the item three-dimensionally in the case where the item is executable by the hand operation and the voice operation, a display mode for displaying the item two-dimensionally in the case where the item is executable only by the voice operation, and a display mode for displaying two-dimensionally in a toned-down manner in the case where the item is non-executable by the hand operation and the voice operation.

11. The input device for the mobile body according to claim 1, wherein the display content generation section generates a display mode for highlighting, when an item executable only by the voice operation is selected by the hand operation, a display content so as to indicate that the item is executable only by the voice operation.

12. The input device for the mobile body according to claim 11, wherein the display content generation section generates a display mode for highlighting a name of the item or for causing an uttered word or the name of the item to be displayed in a pop-up form so as to indicate that the item is executable only by the voice operation.

13. An input method for a mobile body, the input method comprising:
    an input step of receiving inputs by a hand operation and by a voice operation;
    a traveling state determination step of determining a traveling state of the mobile body;
    an item executability determination step of determining, in the traveling state determined by the traveling state determination step, executability by the hand operation and executability by the voice operation of respective items which indicate functions operated by the inputs received by the input step;
    a display content generation step of generating, in accordance with a determination made by the item executability determination step, a display mode for each of the items such that the executability by the hand operation and the executability by the voice operation thereof are distinguishably shown; and
    a display step of displaying each of the items in the display mode generated by the display content generation step.

* * * * *